United States Patent
Arimura et al.

(10) Patent No.: US 7,932,685 B2
(45) Date of Patent: Apr. 26, 2011

(54) CONTROL APPARATUS FOR POWER CONVERSION APPARATUS AND POWER CONVERSION SYSTEM

(75) Inventors: Seikoh Arimura, Chiryu (JP); Tomonori Kimura, Oobu (JP)

(73) Assignee: Denso Corporation, Kariya (JP)

( * ) Notice: Subject to any disclaimer, the term of this patent is extended or adjusted under 35 U.S.C. 154(b) by 275 days.

(21) Appl. No.: 12/400,186

(22) Filed: Mar. 9, 2009

(65) Prior Publication Data
US 2009/0230899 A1 Sep. 17, 2009

(30) Foreign Application Priority Data
Mar. 12, 2008 (JP) .................... 2008-062337

(51) Int. Cl.
*H02P 6/04* (2006.01)
(52) U.S. Cl. .............. 318/400.1; 318/727; 318/375
(58) Field of Classification Search .......... 318/400.1, 318/727, 375, 362, 139; 363/37; 323/283
See application file for complete search history.

(56) References Cited

U.S. PATENT DOCUMENTS
2010/0308027 A1* 12/2010 Vogel ................. 219/130.21

FOREIGN PATENT DOCUMENTS

| GB | 2350244 | 11/2000 |
|---|---|---|
| JP | 2000-358363 | 12/2000 |
| JP | 2000-358364 | 12/2000 |
| JP | 2000-358368 | 12/2000 |
| JP | 2004-357388 | 12/2004 |
| JP | 2006-340442 | 12/2006 |
| JP | 2007-116834 | 5/2007 |

* cited by examiner

*Primary Examiner* — Karen Masih
(74) *Attorney, Agent, or Firm* — Nixon & Vanderhye PC

(57) ABSTRACT

The control apparatus for a power conversion apparatus having chopper circuits and a capacitor, each of which includes a switching circuit and a coil, the switching circuit being on/off-controlled in accordance with specific timings determined in accordance with a current flowing through the coil to create required voltage in the capacitor, includes a function of evenly dividing an interval between adjacent specific timings of one of the chopper circuits to produce divided timings to be allocated to the other chopper circuits, and a function of setting, for each of the other chopper circuits, an on-time period of the switching circuit such that, when the interval varies as a result of which the specific timing of each of the other chopper circuits deviates from a corresponding one of the divided timings, an interval between adjacent specific timings of each of the other chopper circuits is varied to reduce the deviation.

21 Claims, 23 Drawing Sheets iC>0
Sa AND Sd ARE
TURNED OFF iC<0
Sb AND Sc ARE
TURNED OFF iC>0
Sa AND Sd ARE
TURNED ON iC<0
Sb AND Sc ARE
TURNED ON

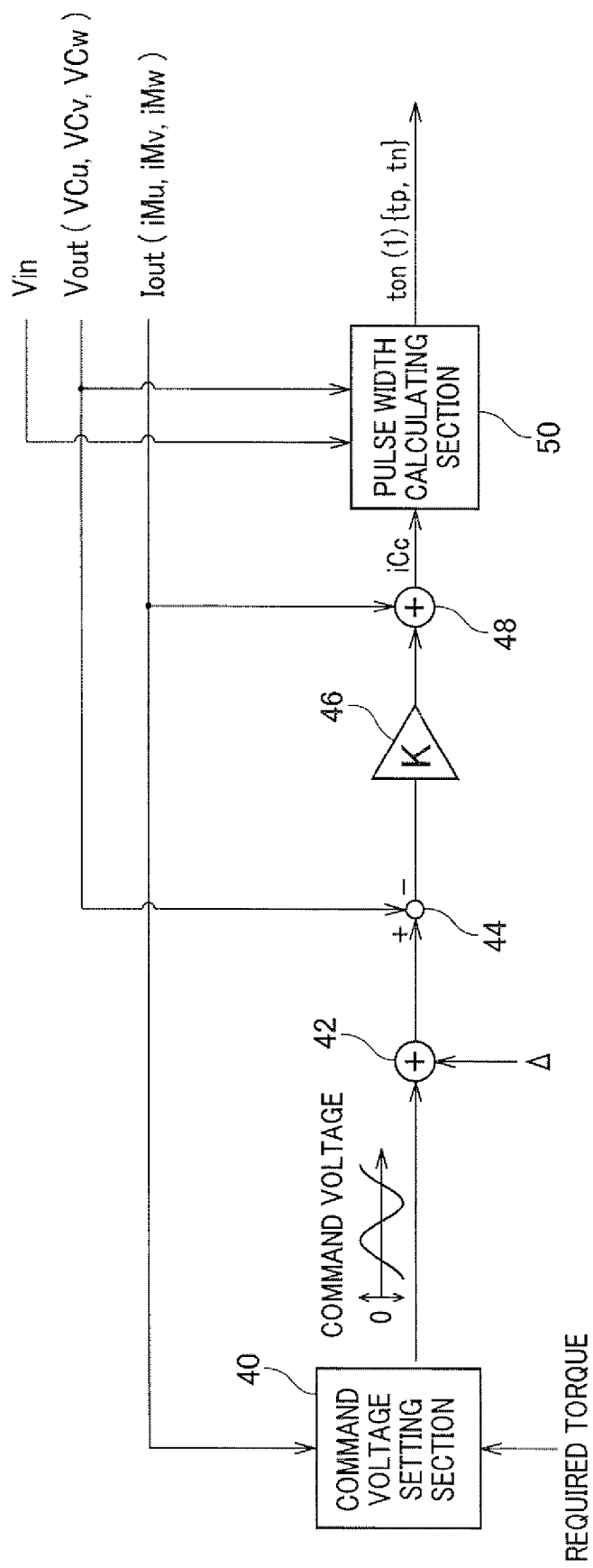

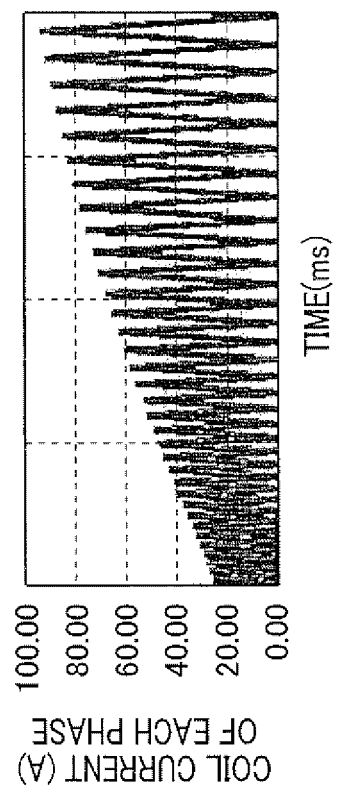
FIG.11A2
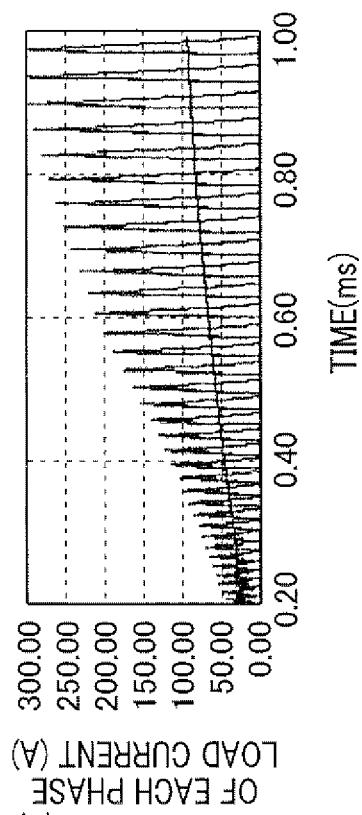
FIG.11B2
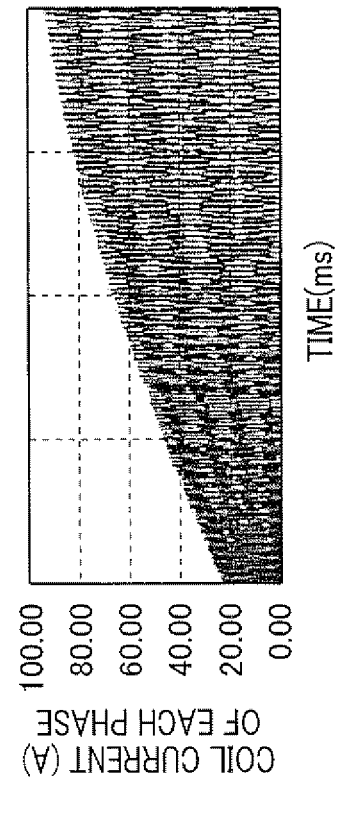
FIG.11A1
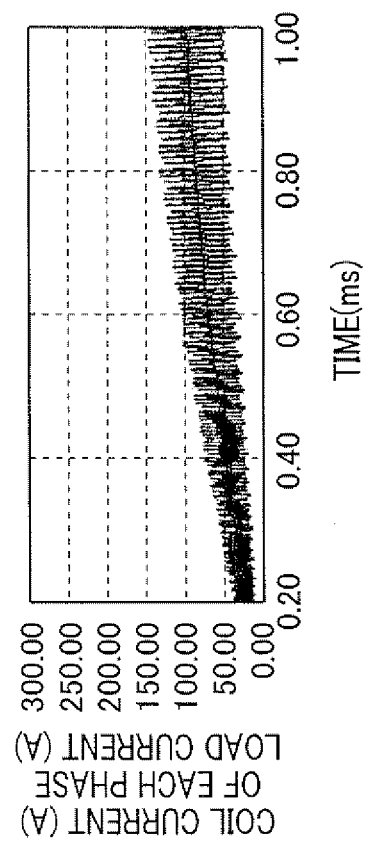
FIG.11B1 iC>0
Sa : ON iC>0
Sa : OFF iC<0
Sb : ON iC<0
Sb : OFF

FIG.18A
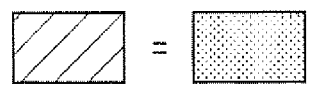
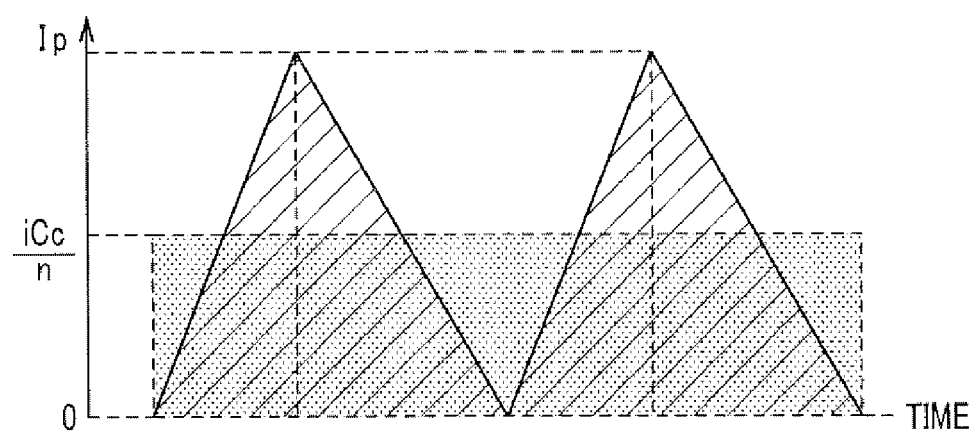
FIG.18B
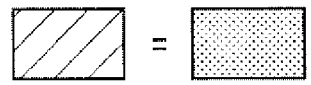
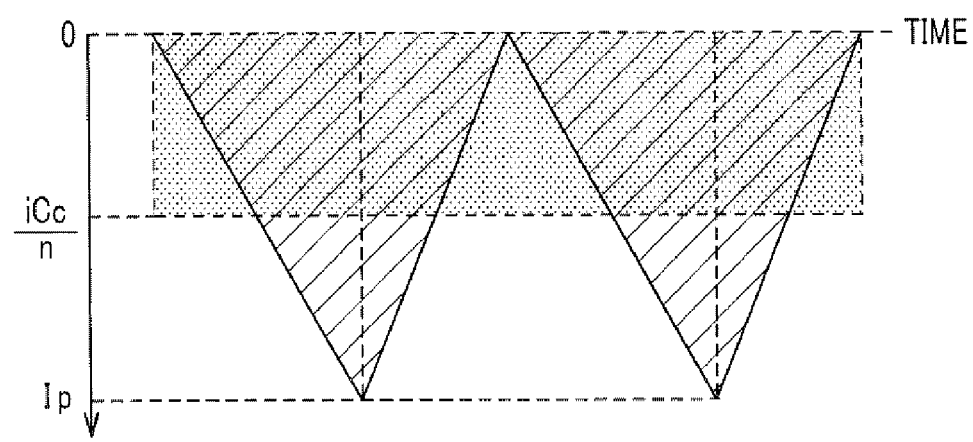

CONTROL APPARATUS FOR POWER CONVERSION APPARATUS AND POWER CONVERSION SYSTEM

CROSS-REFERENCE TO RELATED APPLICATION

This application is related to Japanese Patent Application No. 2008-62337 filed on Mar. 12, 2008, the contents of which are hereby incorporated by reference.

BACKGROUND OF THE INVENTION

1. Field of the Invention

The present invention relates to a control apparatus for a power conversion apparatus including a plurality of chopper circuits, and to a power conversion system including the control apparatus and the power conversion apparatus.

2. Description of Related Art

There is known a control apparatus for a boost converter as a power conversion apparatus, in which switching from off-state to on-state of switching elements of each of chopper circuits included in the boost converter is performed when a current flowing through a coil of each of the chopper circuits becomes 0. For example, refer to Japanese Patent Application Laid-open No. 2000-358368. In this control apparatus, the timing at which switching from off-state to on-state of the switching elements is performed is different from chopper circuit to chopper circuit, so that the switchings are performed at even time intervals for these chopper circuits. When the switching timings of the switching state of the switching elements are evenly spaced apart, a cycle period of increase and decrease of the current flowing through the coil is the same for all the chopper circuits, and accordingly timings at which the currents peak in these chopper circuits respectively are evenly spaced apart. This makes it possible to reduce a ripple current in the boost converter.

However, to vary an output voltage or an output current of the boost converter, it is necessary to vary output currents of the chopper circuits. This requires to vary the timing of switching of the switching state at each of the chopper circuits. In this case, however, as shown in FIG. 23 which shows an example of variations with time of coil currents in a case where the control apparatus includes four chopper circuits, the timings at which the currents respectively flowing through the coils of the chopper circuits reach their peaks cannot be evenly spaced.

SUMMARY OF THE INVENTION

The present invention provides a control apparatus for a power conversion apparatus including a plurality of chopper circuits and a capacitor, each of the chopper circuits including a switching circuit and a coil, the switching circuit being applied with an input voltage and on/off-controlled in accordance with specific timings determined by a value and a sign of variation of a current flowing through the coil to create a required voltage in the capacitor through the coil, the control apparatus comprising:

a first function of evenly dividing a first interval between adjacent two of the specific timings of a selected one of the chopper circuits to produce divided timings to be allocated to the other chopper circuits; and a second function of setting, for each of the other chopper circuits, an on-time period of the switching circuit such that, when the first interval varies by a first amount as a result of which the specific timing of each of the other chopper circuits deviates from a corresponding one of the divided timings, a second interval between adjacent two of the specific timings of each of the other chopper circuits is varied by a second amount, the second variation amount being larger than the first variation amount to reduce deviation between the specific timing of each of the other chopper circuits and the corresponding one of the divided timings.

According to the present invention, there is provided a control apparatus for a power conversion apparatus including a plurality of chopper circuits each of which includes a switching circuit and a coil, the control apparatus being capable of setting switching timings of the switching circuits in accordance with coil currents in the chopper circuits such that they are evenly spaced apart even when a required output current of the conversion apparatus is varied.

Other advantages and features of the invention will become apparent from the following description including the drawings and claims.

BRIEF DESCRIPTION OF THE DRAWINGS

In the accompanying drawings:

FIG. 5 is a block diagram of a master phase pulse width calculating section included in the control apparatus of the first embodiment;

FIGS. 11A1, 11A2, 11B1 and 11B2 are diagrams showing other simulation results of the chopper control in the first embodiment;

FIGS. 18A and 18B are diagrams for explaining operation of a pulse width calculating circuit included in a master phase pulse width calculating section included in the control apparatus of the fourth embodiment;

PREFERRED EMBODIMENTS OF THE INVENTION

First Embodiment

Figure 1:
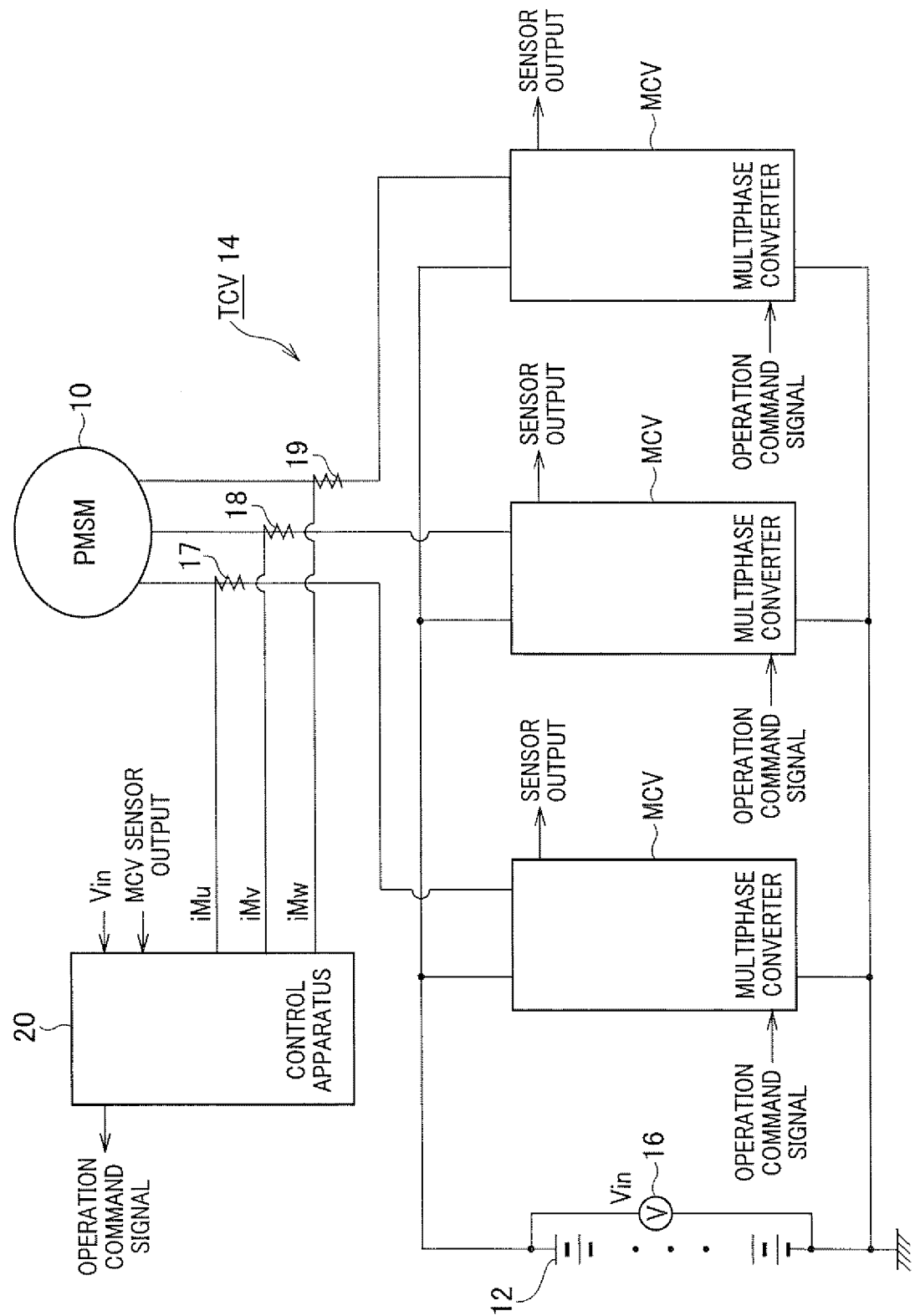
FIG. 1 is a diagram showing an overall structure of a power conversion system for a hybrid vehicle, the system including a power conversion apparatus supplying power to a motor and controlled by a control apparatus according to a first embodiment of the invention.

FIG. 1 is a diagram showing an overall structure of a power conversion system for a hybrid vehicle, the system including a power conversion apparatus supplying power to a motor and controlled by a control apparatus according to a first embodiment of the invention.

In FIG. 1, the reference numeral 10 denotes an electric motor (PMSM: Permanent Magnet Synchronous Motor) as a power generating means for the hybrid vehicle. The motor 10 is connected to a high voltage battery 12 through a three-phase converter (may be referred to as "TCV" hereinafter) 14 as the power conversion apparatus. The high voltage battery 12 may be a nickel hydrogen storage battery or a lithium storage battery.

Figure 2:
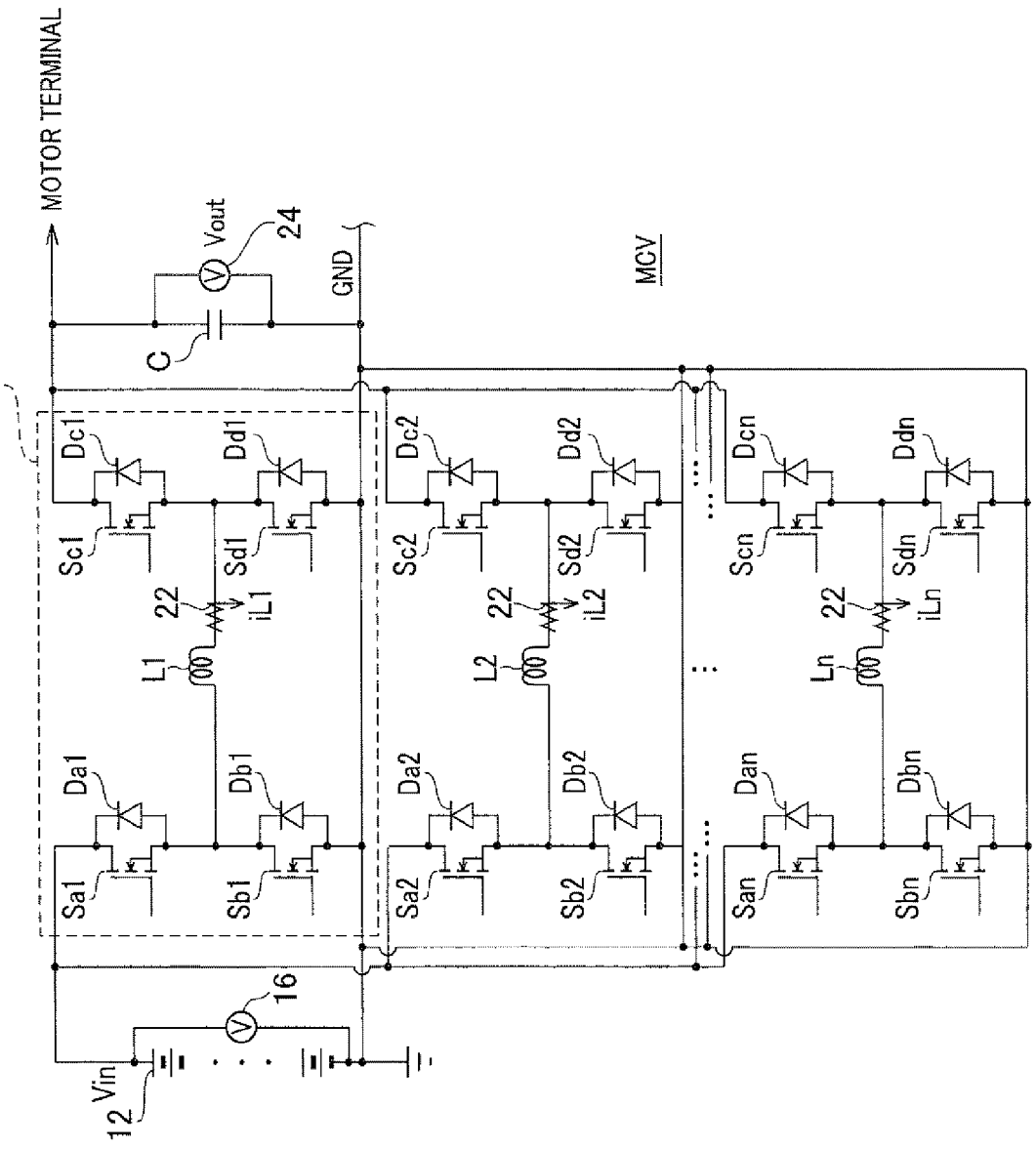
FIG. 2 is a diagram showing a circuit structure of multiphase converters included in the power conversion system of the first embodiment.

The TCV 14 is constituted by a plurality of multiphase converters MCV respectively connected to corresponding phases of the motor 10. The TCV 14 can continuously adjust each of the voltages applied to the phases of the motor 10. FIG. 2 is a diagram showing a circuit structure of the multiphase converter MCV. As shown in FIG. 2, the multiphase converter MCV is a non-inversion type back-boost converter including a capacitor C, and configured to convert the voltage of the high voltage battery 12 to a required voltage and accumulates it in the capacitor C. The multiphase converter MCV further includes n (n being an integer larger than 1) chopper circuits CP disposed between the capacitor C and the high voltage battery 12. Each of the chopper circuits CP has the same circuit structure as a well-known conventional DC/DC converter from which its output capacitor is removed. That is, the chopper circuit CP is constituted of a first series connection of a switching element Sai (i being an integer from 1 to n) and a switching element Sbi parallel-connected to the high voltage battery 12, a second series connection of a switching element Sci and a switching element Sdi parallel-connected to the capacitor C, and a coil Li connecting the connection node of the switching elements Sai and Sbi with the connection node of the switching elements Sci and Sdi. In this embodiment, each of the switching elements Sai, Sbi, Sci and Sdi is a power MOSFET. The switching elements Sai, Sbi, Sci and Sdi are parallel-connected with diodes Dai, Dbi, Dci and Ddi, respectively. The diodes Dai, Dbi, Dci and Ddi may be a body diode such as a power MOSFET. In the following description, to distinguish the n chopper circuits CP from one another, they are referred to as "the chopper circuit of the first phase", "the chopper circuit of the second phase", . . . , and "the chopper circuit of the n-th phase".

The power conversion system of this embodiment includes the following components to detect its various states. A voltage sensor 16 for detecting the voltage of the high voltage battery 12 as an input voltage Vin to the multiphase converters MCV. A current sensor 22 provided in each chopper circuit of each multiphase converter MCV to detect a current iLi flowing through the coil Li. A voltage sensor provided in each multiphase converter MCV to detect a voltage of the capacitor C as an output voltage Vout of the multiphase converter MCV. Current sensors 17, 18 and 19 for detecting phase currents of the motor 10.

The reference numeral 20 in FIG. 1 denotes the control apparatus which receives sensor signals outputted from the above described various sensors, and outputs command signals to the TCV 14 to control the motor 10. In more detail, the control apparatus 20 performs chopper control (on/off control) on the switching elements Sai, Sbi, Sci and Sdi of each multiphase converter MCV in order to convert the voltage of the high voltage battery 12 to a required voltage, to thereby control the voltages applied to the respective phases of the motor 10.

Next, the chopper control in this embodiment is explained with reference to FIGS. 3A to 3D. FIGS. 3A to 3D show one of the n chopper circuits CP constituting the multiphase converter MCV. In FIGS. 3A to 3D, the reference character of each of the switching elements is not provided with the suffix number. For example, the switching elements Sa1 to San are indicated by "Sa". In FIGS. 3A to 3D, to simply explain it is assumed that an amount of charge moving between terminals of the multiphase converter MCV and the motor 10 is negligibly small for ease of explanation.

Figure 3B:
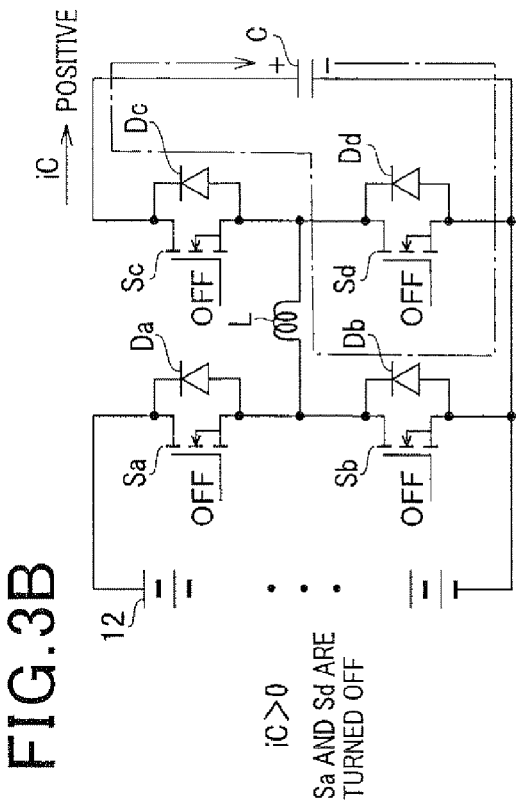
FIGS. 3A to 3D are diagrams for explaining operation of one of chopper circuits constituting the multiphase converter.
Figure 3D:
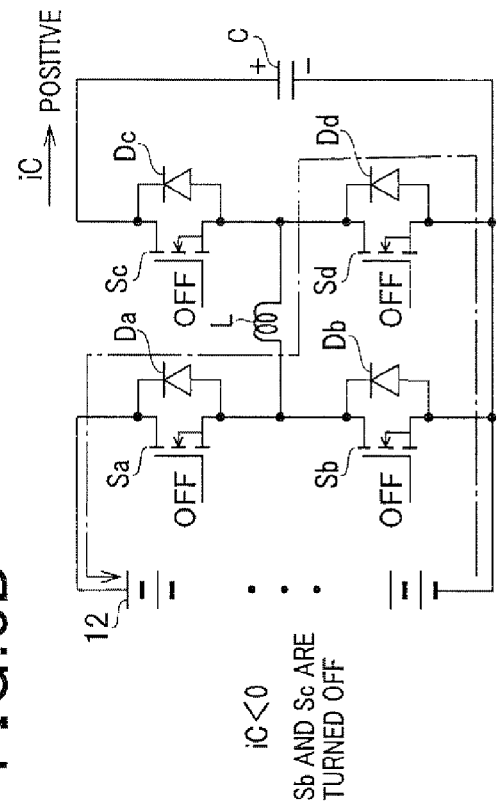
Figure 3A:
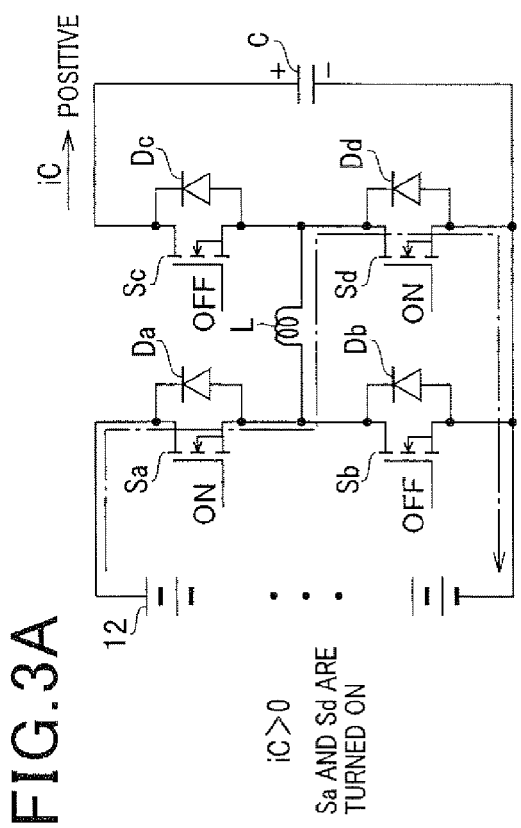

First, explanation is given for the case where the sign of the output current of the chopper circuit CP is positive (when the capacitor C is charged by the chopper circuit CP) with reference to FIGS. 3A and 3B. As shown in FIG. 3A, when the switching elements Sa and Sd are turned on, a current flows through a closed loop circuit constituted by the high voltage battery 12, switching element Sa, coil L, and switching element Sd. Thereafter, when the switching elements Sb and Sc are turned off, a current due to a back electromotive force of the coil L flows through a closed loop constituted by the coil L, diode Dc, capacitor C, and diode Db. As a result, the capacitor C is charged.

Figure 3C:
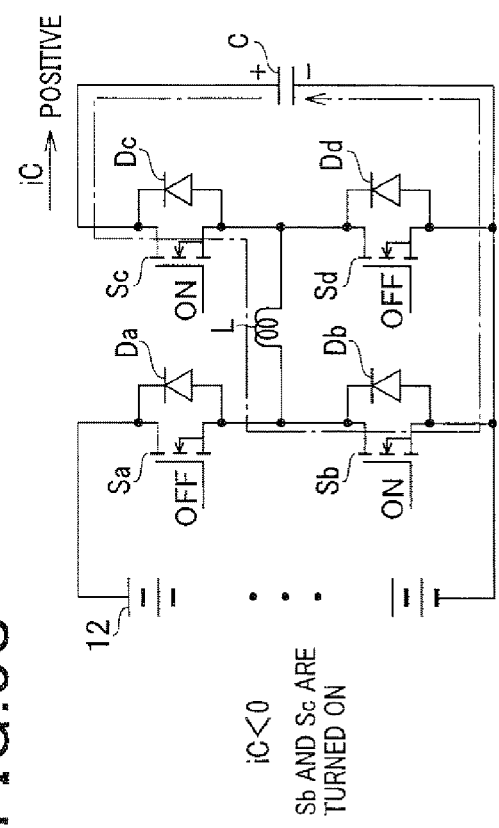

Next, explanation is given for the case where the sign of the output current from the chopper circuit CP is negative with reference to FIGS. 3C and 3D. As shown in FIG. 3A, when the switching elements Sb and Sc are turned on, a current flows through a closed loop circuit constituted by the capacitor Cr switching element Sc, coil L, and switching element Sb. As a result, the capacitor C is discharged. Thereafter, when the switching elements Sc and Sd are turned off, a current due to a back electromotive force of the coil L flows through a closed loop constituted by the coil L, diode Da, high voltage battery 12 and diode Dd.

Figure 4:
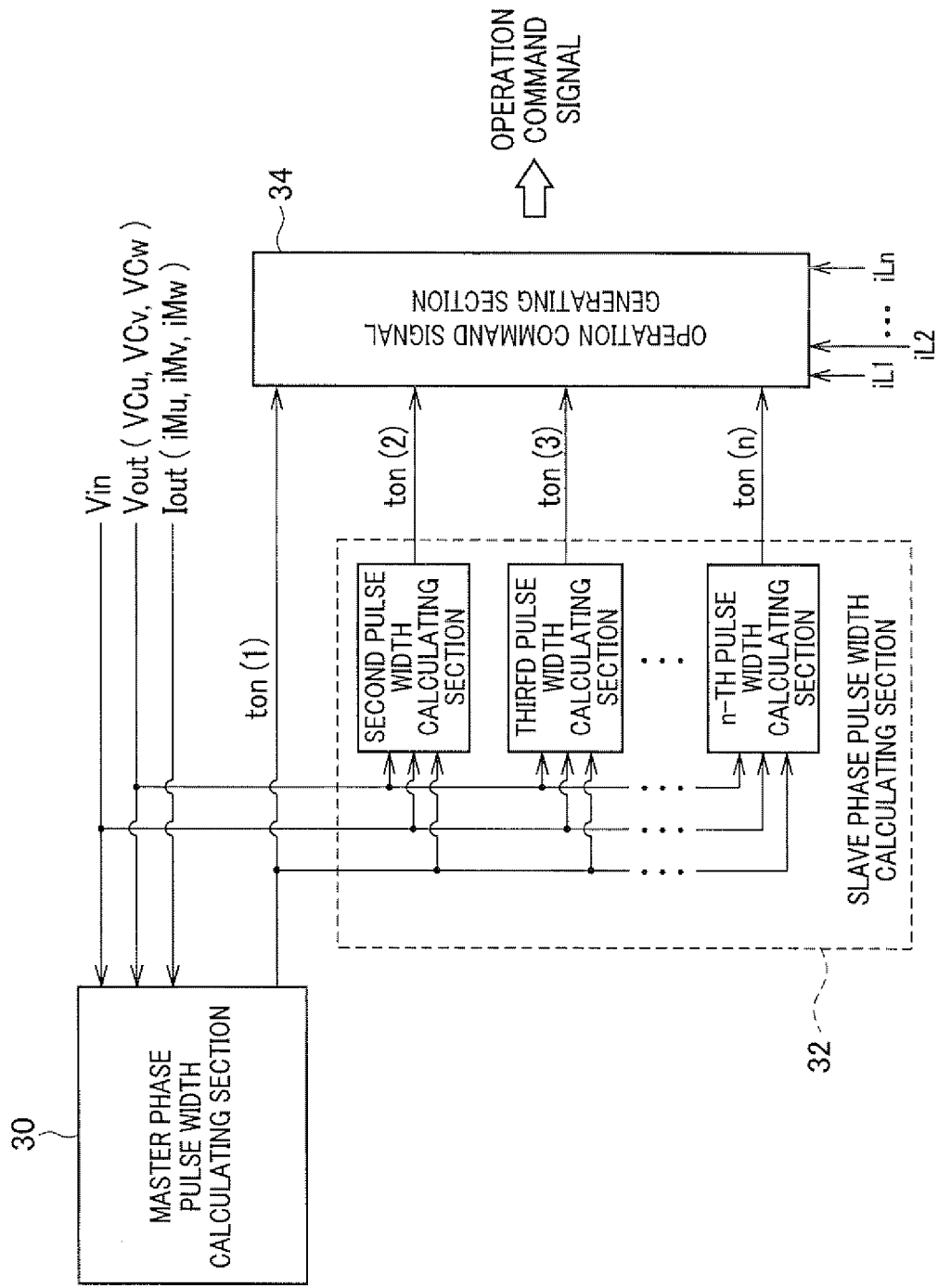
FIG. 4 is a block diagram of the control apparatus of the first embodiment.

By performing the above chopper control to convert the voltage of the high voltage battery 12 as a DC power supply, to thereby by adjust the voltage of the capacitor C, it is possible to apply an adjusted analog voltage to the motor 10. However, actually, due to movement of charge between the multiphase converter MCV and the motor 10, rise or fall of the voltage of the capacitor C and the sign of the output current of the capacitor C are not in a one-to-one relationship in a precise sense. In this embodiment, in order to correctly control the voltage of the capacitor C even when rise or fall of the voltage of the capacitor C and the sign of the output current of the capacitor C are not in a one-to-one relationship, an operation command signal to be given to each multiphase converter MCV is generated by the process explained below with reference to FIG. 4. As shown in FIG. 4, the control apparatus 20 includes a master phase pulse width calculating section 30, a slave phase pulse width calculating section 32, and an operation command signal generating section 34.

The master phase pulse width calculating section 30 calculates an on-time period ton (1) of the switching elements Sa1, Sb1, Sc1 and Sd1 constituting the chopper circuit CP of the first phase. Actually, the on-time period ton (1) is calculated for each phase of the motor 10. This calculation is performed on the basis of the output voltage Vout (the voltage of the capacitor C of the multiphase converter MCV for each phase of the motor 10) detected by the voltage sensor 24, the output current Iout (the phase currents iMu, iMv, iMw detected by the current sensors 17 to 19), and the input voltage Vin.

On the other hand, the slave phase pulse width calculating section 32 calculates on-time periods (2) to (n) of the switching elements Sam, Sbm, Scm and Sdm (m being an integer from 2 to n) of the other chopper circuits CP. The slave phase pulse width calculating section 32 includes (n−1) pulse width calculating sections each of which calculates the on-time period ton (m) on the basis of the input voltage Vin, the output voltage Vout and the on-time period ton (1) of the master phase.

The operation command signal generating section 34 generates operation command signals for the switching elements Sai, Sbi, Sci and Sdi of each multiphase converter MCV for respective phases of the motor 10 on the basis of the currents iLi to film detected by the current sensors 22 and the on-time period ton(i).

Next, explanation is given for the process of the chopper control of the master phase performed in accordance with the on-time period ton (1) calculated by the master phase pulse width calculating section 30 with reference to FIG. 5. As shown in FIG. 5, the master phase pulse width calculating section 30 includes a command voltage setting section 40, an offset correcting section 48, a deviation value calculating section 44, a feedback control section 46, a feedforward correcting section 48, and a pulse width calculating circuit 50. Although the chopper control is performed separately for each of the three phases of the motor 10, the process thereof is common for these phases, this process is explained for only one of the three phases in the following.

The command voltage setting section 40 sets a command value (command voltage Vc) of the output voltage of the multiphase converter MCV on the basis of the phase currents iMu, iMv and iMw of the motor 10 (the output current Iout of the multiphase converter MCV), and a required torque. This process may be performed by a well-known current feedback control in this case, the command voltage Vc of each phase of the motor 10 is calculated as a feedback control amount in feed backing actual currents in the d-axis and q-axis, which can be obtained by performing 2-phase conversion on the phase currents iMu, iMv and iMw, to the command currents in the d-axis and q-axis calculated depending on the required torque. The feedback control may be a proportional-integral control. The command voltage Vc thus set is converted into an AC signal such as a sinusoidal signal.

The offset correcting section 42 makes a correction to the command voltage Vc by adding thereto an offset voltage Δ. This is done to fix the polarity of the voltage of the capacitor C under condition that the command voltage Vc is an AC signal such as a sinusoidal signal whose amplitude center is 0 volt. By making such a correction, the voltage of the capacitor C is controlled so as to vary around the offset voltage Δ as its amplitude center. Incidentally, it is sufficient that the offset voltage Δ is not smaller than a maximum value of the amplitude of the command voltage Vc for fixing the polarity of the voltage of the capacitor C, however, in this embodiment, the offset voltage Δ is set to a voltage which is higher than the maximum value of the command voltage Vc by a predetermined value. This is to make the rate of current variation rate due to the chopper control larger than a predetermined value in view of the fact that the current variation due to the chopper control depends on the voltage of the capacitor C and the voltage of the high voltage battery 12.

The command voltage Vc which has been offset-corrected is received by the deviation value calculating section 44. The deviation value calculating section 44 subtracts the output voltage Vout of the multiphase converter MCV (the voltages VCu, VCv and VCw applied to the respective phases of the motor 10) from the output of the offset correcting section 42. The output of the deviation value calculating section 44 is received by the feedback control section 46 which performs a proportional-integration control. In this proportional-integration control, a proportion gain K is set depending on the capacitance of the capacitor C and a required rate of variation of the voltage of the capacitor C. The output of the feedback control section 46 is received by the feedforward correcting section 48. The feedforward correcting section 48 calculates an output command value ICc to he given to the side of the capacitor C and the motor 10 by adding the output current Iout to the output of the feedback control section 46. The output command value iCc indicates a str of a current to be supplied to the capacitor C and a current to be supplied to the motor 10. The pulse width calculating circuit 50 calculates an on-time period tp of the switching element Sa1 and Sd1, or an on-time period tn of the switching elements Sb1 and Sc1 on the basis of the output command value iCc, the voltage of the high voltage battery 12 (the input voltage Vin) and the output voltage Vout, in order to make the output current flowing to the side of the capacitor C and the motor 10 equal to 1/n of the output command value iCc. As a result, the amount of the output currents of the n chopper circuits CP is controlled to be equal to the output command value iCc.

Figure 6A:
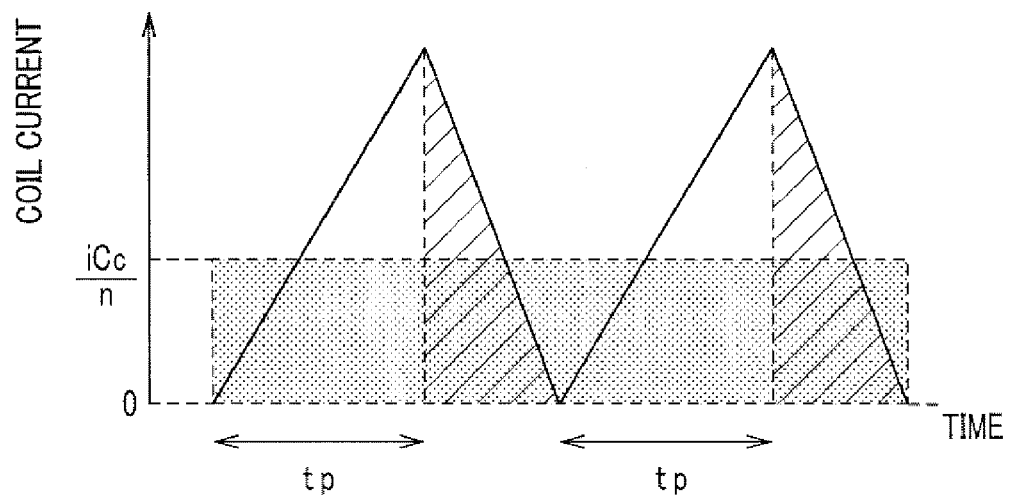
FIGS. 6A and 6B are time charts for explaining operation of a pulse width calculating circuit of the master phase pulse width calculating section included in the control apparatus of the first embodiment.

Next, the operation of the pulse width calculating circuit 50 is explained with reference to FIG. 6A showing the current flowing through the coil L1 when the sign of the output current iC is positive.

Figure 23:
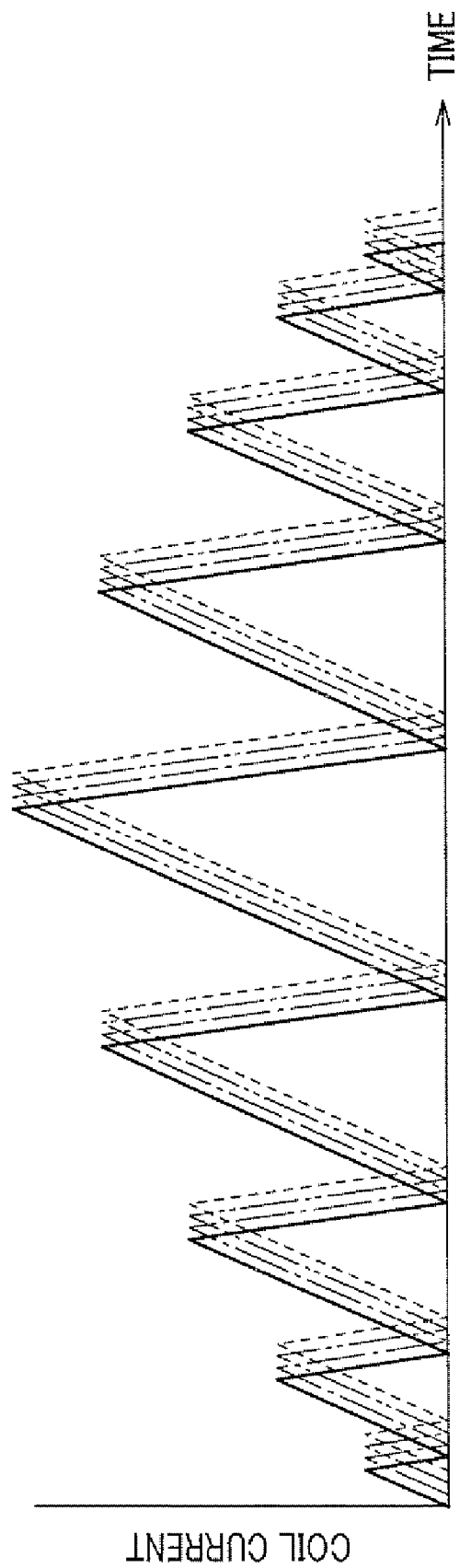
FIG. 23 is a time chart for explaining chopper control operation performed by a conventional control apparatus.

Here, the on-time period tp indicates an on-time period of the switching elements Sa1 and Sd1. As shown in this figure, when the switching elements Sa1 and Sd1 are turned on, the current flowing through the coil L1 gradually increases as explained with reference to FIG. 2A. Thereafter when the on-time period tp elapses, the switching elements Sa1 and Sd1 are turned off as a result of which the current flowing through the coil L gradually decreases as explained with reference to FIG. 23. In this embodiment, when the current flowing through the coil L becomes 0, the switching elements Sa1 and Sd1 are turned on again.

On a microscopic time scale, the current flowing to the side of the capacitor C and the motor 10 cannot be made equal to the command value iCc, because this current flows only during the time period in which the switching elements Sa1 and Sd1 are off, and this current gradually decreases. Accordingly, in this embodiment, an average of the current outputted to the side of the capacitor C and the motor 10 during a predetermined time period is made equal to the output command value iCc, and this predetermined time period is set to the on/off cycle period of the switching elements Sa1 and Sd1. In FIG. 6A, the amount of charge supplied to the side of the capacitor C and the motor 10 is indicated by the area of the hatched portion. If this area of the hatched portion can be made equal to 1/n of a value of the output command value iCc integrated during one on/off cycle period, an average value of the actual output current flowing to the side of the capacitor C and the motor 10 can be made equal to 1/n of the output command value iCc. This is possible by setting the on-time period tp as follows.

When the inductance of the coil L1 is L, the on-time period is tp, the input voltage is Vin, and the peak value of the current flowing through the coil L1 while repeating gradual increase and decrease is Ip, the following equation (c1) holds.

$$Vin = L \cdot Ip/tp \quad (c1)$$

When the off-time period is toff, and the output voltage of the capacitor is Vout, the following equation (c2) holds.

$$Vout = L \cdot Ip/toff \quad (c2)$$

From the equations (c1) and (c2), the following equation (c3) is obtained.

$$Vin/Vout = toff/tp \quad (c3)$$

The average value of the current supplied to the side of the capacitor C and the motor 10 during the above described one cycle period is given by the following equation (c4)

$$Ip \cdot toff/\{2 \cdot (tp + toff)\} = tp \cdot Vin \cdot Vin/2 \cdot L \cdot (Vin + Vout) \quad (c4)$$

If this value is equal to 1/n of the output command value iCc, the following equation (c5) is obtained.

$$tp = 2 \cdot L \cdot iCc \cdot (Vin + Vout)/(Vin \cdot Vin \cdot n) \quad (c5)$$

Figure 6B:
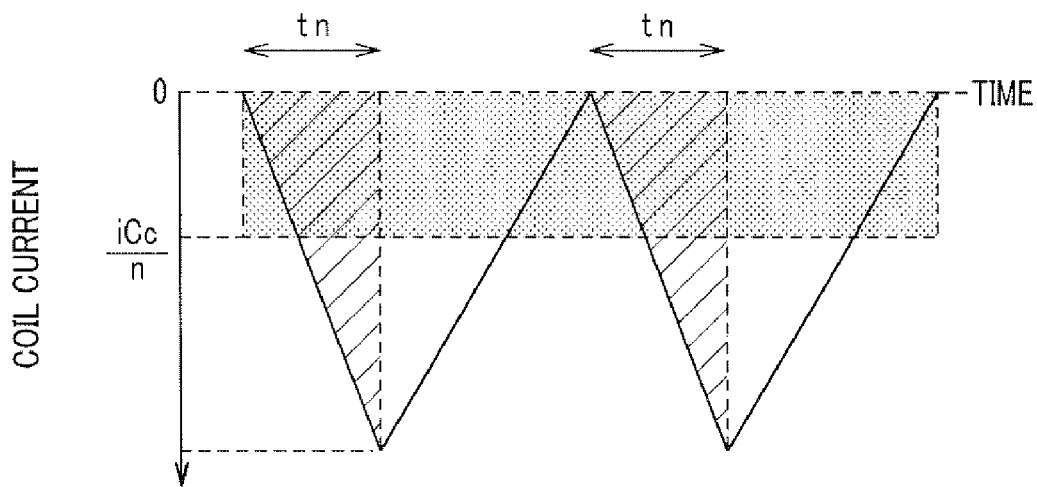

FIG. 6B shows the current flowing through the coil L1 when the sign of the output current iC is negative. Here, the on-time period tn indicates an on-time period of the switching elements Sb1 and Sc1. As shown in this figure, when the switching elements Sb1 and Sd1 are turned on, the absolute value of the current flowing through the coil L1 gradually increases as explained with reference to FIG. 2C. Thereafter when the on-time period tn elapses, the switching elements Sb1 and Sc1 are turned off as a result of which the absolute value of the current flowing through the coil L gradually decreases as explained with reference to FIG. 2D. In this embodiment, when the current flowing through the coil L1 becomes 0, the switching elements Sb1 and Sc1 are turned on again.

Also in this case, in order to make the average value of the output current flowing to the side of the capacitor C and the motor 10 during the predetermined time period equal to 1/n of the output come and value iCc, the amount of charge extracted from the side of the capacitor C and the motor 10 (indicated by the area of the hatched portion) during the on-time period tn is made equal to 1/n of a value of the output command value iCc integrated during one on/off cycle period of the switching elements Sb1 and Sc1. This is possible by setting the on-time period tn in accordance with the following equation (c6).

$$tn = 2 \cdot L \cdot (-iCc) \cdot (Vin + Vout)/(Vin \cdot Vout \cdot n) \quad (c6)$$

As understood from the equations (c5) and (c6), the on-time periods tp and tn can be calculated from the output command value iCc, the input voltage Vin and the output voltage Vout. Which of the on-time period tp and the on-time period tn should be used is determined by the sign of the output command value iCc. One of the n-time period tp and the on-time period tn selected depending on the output command value iCc becomes the on-time period ton(1) outputted from the master phase pulse width calculating section 30.

Figure 7:
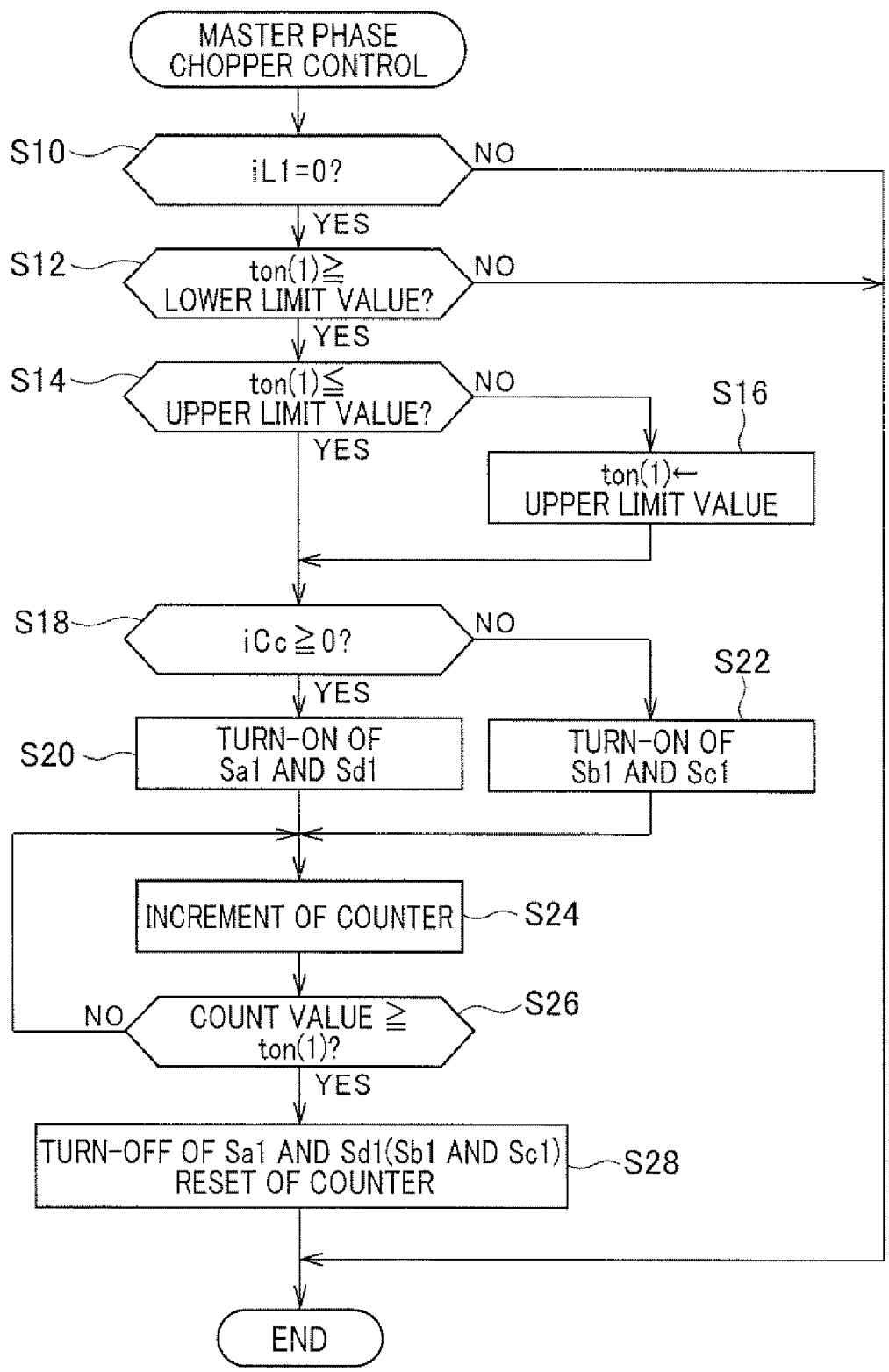
FIG. 7 is a flowchart showing a chopper control process for a master phase performed by the control apparatus of the first embodiment.

FIG. 7 is a flowchart showing the chopper control process in accordance with the on-time period ton(1) which the control apparatus 20 performs for the master phase at predetermined time intervals.

This process begins by determining whether or not the current iL1 flowing through the coil L1 becomes 0 at step S10. Step S10 is provided for making a determination as to whether or not it is timing to switch the switching elements Sa1 and Sd1 (or Sb1 and Sc1) from on-state to off-state. If the determination result at step S10 is affirmative, the process proceeds to step S12. At step S12, it is determined whether or not the on-time period ton (1) is equal to or longer than a lower limit value. The lower limit value is set to a minimum time to assure normal operation of the switching elements Sa1 and Sd1 (or Sb1 and Sc1).

If the determination result at step S12 is affirmative, the process proceeds to step S14 where it is determined whether the on-time period ton (1) is equal to or shorter than an upper limit value. The upper limit value is set to a maximum time to prevent occurrence of magnetic saturation in the coil L due to the current flowing through the coil L becoming excessively large. Actually, a peak value of the current flowing through the coil L is not determined uniquely by only the on-time period ton (1), but it also depends on the input voltage Vin and the output voltage Vout. Accordingly, it is desirable that the upper limit value is variably set depending on the input voltage Vin when the output command value iCc is positive, and variably set depending on the output voltage Vout when the output command value iCc is negative. If the determination result at step S14 is negative, that is, if the current is determined to be larger than the upper limit value, the process proceeds to step S16 where the upper limit value is set to the on-time ton period (1).

If the determination result at step S14 is affirmative, that is if the current is determined to be equal to or smaller than the upper limit value, the process proceeds to step S18 where it is determined whether or not the output command value iCc is equal to or larger than 0. Step S18 is provided for making a determination as to which of the switching elements Sa1, Sd1, and switching elements Sb1, Sc1 should be turned on. If the determination result at step S18 is affirmative, the process proceeds to step S20 where the switching elements Sa1 and Sd1 are turned on. On the other hand, if the determination result at step S18 is negative, the process proceeds to step S22 where the switching elements Sb1 and Sc1 are turned on.

Thereafter, at step S24, a counter for measuring the on-time period is incremented. At subsequent step S26, it is determined whether or not the count value of the counter has reached the on-time period ton (1). If the determination result at step 326 is affirmative, the process proceeds to step S28 where the switching elements Sa1 and Sd1 (or Sb1 and Sc1) are turned off, and the counter is reset.

If the determination result at step S10 or S12 is negative, or when step S28 is completed, the process is terminated. Next, the chopper control of the slave phase is explained. When the multiphase converters MCV are operated to apply the command voltage Vc to the respective phases of the motor 10, the manner of the chopper control varies significantly due to large variation of the output command value cCi. Accordingly, if the chopper control is performed in accordance with the output command value iCc for each slave phase in the same as the master phase, the ripple current may become excessively large as explained with reference to foregoing FIG. 23.

To reduce the ripple current, it is needed that the increase/decrease cycle of the absolute value of the current flowing through the coil Li of each phase occurs "uniformly". It is desirable to define an appearance Liming of this increase/decrease cycle to clearly define the above "uniformly". Accordingly, in this embodiment, a timing at which the value and sign of the current flowing through the coil Li match those specified in advance is called a "specific timing", and this specific timing is used to define the appearance timing. This specific timing occurs once during one cycle of the current flowing through the coil Li while repeating increase and decrease periodically to control the output voltage Vout. The above term "specific timing" is equivalent to the term generally called "phase" in the multiphase DC/DC converter. The specific timing may be a timing at which the current peaks. In this case, the specific timing can be defined as a timing at which the sign of variation of the current changes from positive to negative. In the case where the switching elements are turned on when the current becomes 0 as is the case with this embodiment, it is convenient to define the specific timing by the peak value of the current in view of quantifying the ripple current. This is because, the ripple current can be determined to be in the most reduced state when the currents each flowing through the coil Li (maybe referred to as "coil current" hereinafter) peak at regular time intervals for any hardware used.

However, in this embodiment, since the switching elements are turned on at the timing when the coil current becomes 0, and the timing to turn off the switching elements is determined in accordance with the output command value iCc, the peak value of the coil current may vary. Accordingly, to define the specific timing, it is more convenient to use a timing at which the coil current becomes 0 in view of ease of control. It can be regarded that when the timings at which the coil currents in the respective chopper circuits Cp become 0 occurs at even time intervals, the timings at which the currents peak occur at even time intervals. Accordingly, in this embodiment, the timing at which the coil current iL becomes 0 when the switching elements are turned on is used as the specific timing. In order that the specific timings in the respective chopper circuits occur at even time intervals, an equalizing process in which the time interval between adjacent two of the specific timings of the master phase is evenly divided by n to produce n timings, and these n timings are allocated to the specific timings of (n−1) slave phase. However, the time interval between adjacent two of the specific timings of the master phase itself varies depending on the output command value iCc. Accordingly, when the specific timings of the slave phases deviate from the timings produced by dividing the time interval between adjacent two of the specific timings of the master phase due to variation of this time interval a process to reduce the deviation is performed additionally. Next, the above equalizing process is explained with reference to FIG. 8.

Figure 8:
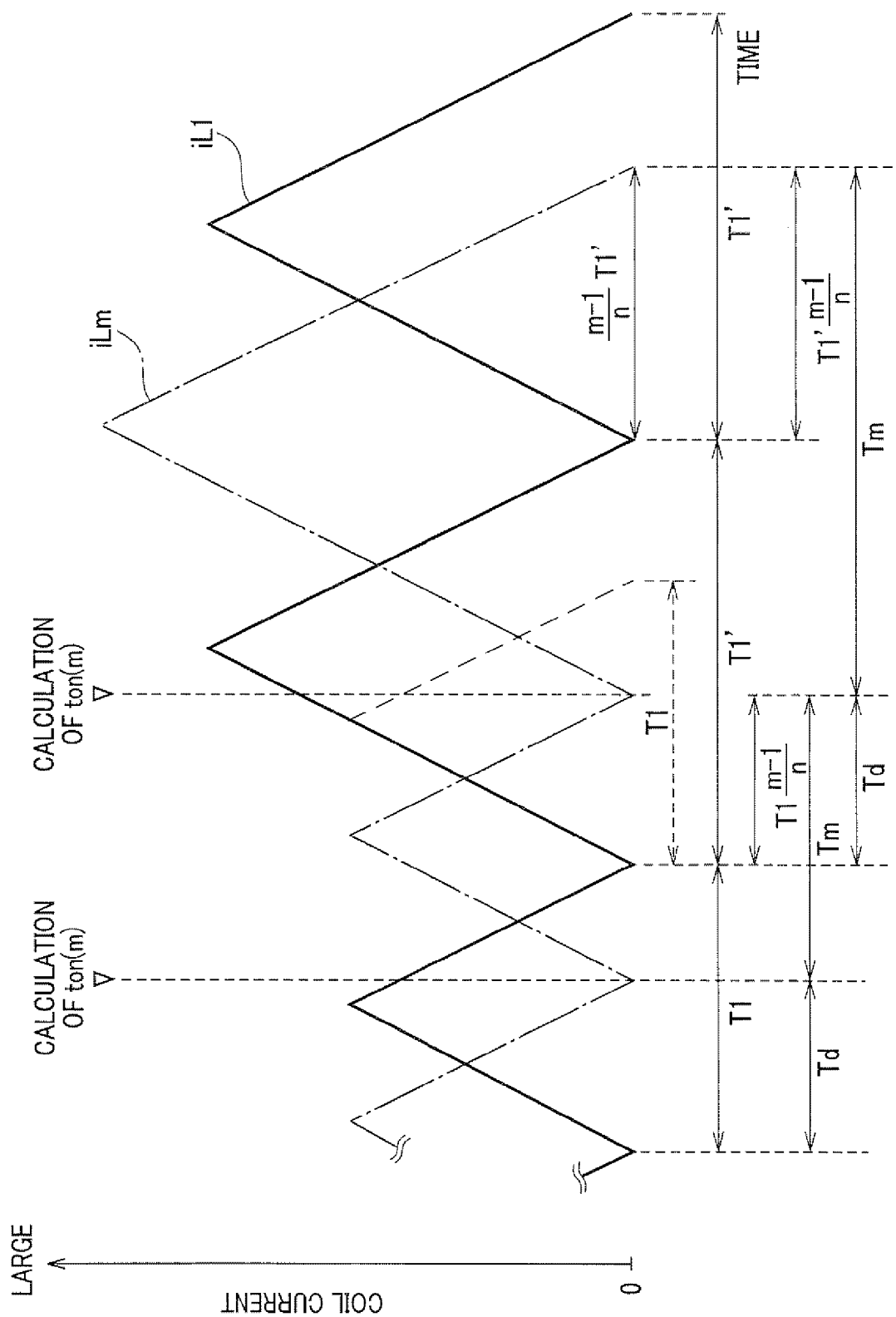
FIG. 8 is a time chart for explaining a chopper control operation for a slave phase performed by the control apparatus of the first embodiment.

In FIG. 8, the solid line indicates a current iLi flowing through the coil L1 of the master phase, and the dashed line indicates a current iLm flowing through the coil Lm in the chopper circuit of the m-th phase. FIG. 8 shows a case where the cycle period of increase/decrease of the current iL1 of the master phase varies to increase from T1 to T1'. As shown in this figure, because of the increase of the cycle period of the current iL1 of the master phase, the specific timing immediately after this increase in the chopper circuit CP of the m-th phase deviates from the (m−1)-th one of the timings produced by evenly dividing the cycle period T1' by n. Accordingly, in the m-th phase, the on-time period is set such that the next cycle period is further increased from T1' so that the (m−1)-th one of the timings produced by evenly dividing the next cycle period T1' of the master phase by n coincides with the specific timing of the m-th phase.

In more detail, a time difference Td between the specific timing of the master phase and the subsequent specific timing of the m-th phase is measured. The next cycle period Tm is set such that the measured time difference Td added by the next cycle period Tm becomes equal to a sum of the present cycle period T1' of the master phase multiplied by (m−1)/n and the cycle period T1'. According to this setting, it is possible to make the next specific timing of the m-th phase coincident with the (m−1)-th one of the timings produced by evenly dividing the time interval between adjacent specific timings of the master phase between which this next specific timing is located, if the next cycle period of the master phase does not change from T1'. Incidentally, the present cycle period T1' of the master phase less the time difference Td is a parameter to quantify the degree of the above timing deviation. That is, when the difference between the time difference Td and the present cycle period T1' multiplied by (n−m+1)/n is larger, it means that the timing deviation is larger.

To make the above setting, the on-time period ton (m) is set in accordance with the following equation (c7) when the output command value iCc is positive.

$$\text{ton}(m) = \text{ton}(1) \cdot (n+m-1)/n - Td \cdot Vout/(Vin+Vout) \quad (c7)$$

This equation (c7) is derived in the following way. With reference to the foregoing equation (c3), the cycle period Tm can be predicted in accordance with the following equation (c9) which includes a term of the current switching state (the on-time period ton(m)).

$$Tm = ton(m) + toff(m) \quad (c9)$$
$$= ton(m) \cdot (Vout + Vin)/Vout$$

On the other hand, the cycle period T1 of the master phase can be predicted in accordance with the following equation (c10) which includes a term of the current switching state (the on-time period ton(1)).

$$T1 = \text{ton}(1) \cdot (Vout + Vin)/Vout \quad (c10)$$

FIG. 8 indicates that following equation (c11) needs to be satisfied.

$$Td + Tm = T1 + T1 \cdot (m-1)/n \quad (c11)$$

By substituting the equations (c9) and (c10) into the equation (c11), the above equation (c7) is obtained.

Likewise, when the output command value iCc is negative, the on-time period time) is set in accordance with the following equation (c12).

$$\text{ton}(m) = \text{ton}(1) \cdot (n+m-1)/n - Td \cdot Vin/(Vin+Vout) \quad (c12)$$

Figure 9:
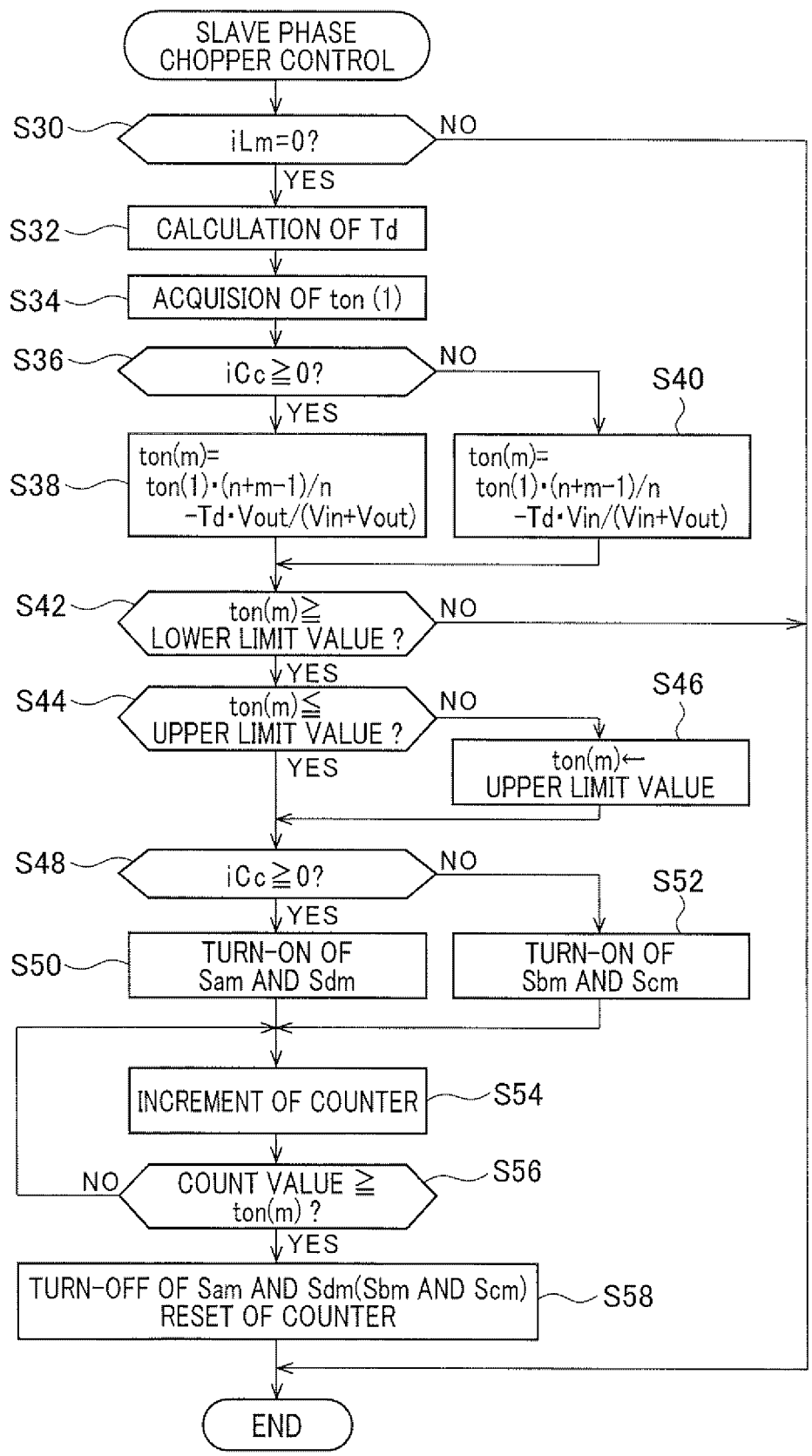
FIG. 9 is a flowchart showing a chopper control process for a slave phase performed by the control apparatus of the first embodiment.

Next, the chopper control process for the slave phases such as shown in FIG. 8 is explained with reference to the flowchart of FIG. 9. This process is performed at predetermined time intervals by the control apparatus 20.

This process begins by determining whether or not the coil current iLm of the m-th phase is 0 at step S30. The purpose of step S30 is the same as that of step S10 in the foregoing FIG. 7. If the determination result at step S30 is affirmative, the process proceeds to step S32 where the time difference Td with the master phase is calculated. Step S32 is provided for calculating the time difference between the timing at which an affirmative determination is made at step S10 in the process shown in FIG. 7 and the timing at which an affirmative determination is made at step 30 in this process. At subsequent step S34, the on-time period ton(1) of the master phase is acquired. Next, the process proceeds to step S36 to determine whether or not the output command value iCc is equal to or larger than 0. If the determination result at step S36 is affirmative, the process proceeds Lo step S38 where the on-time period ton(m) is calculated in accordance with the equation (c7). On the other hand, if the determination result at step S36 is negative, the process proceeds to step S40 where the on-time period ton(m) is calculated in accordance with the equation (c12).

After completion of step S38 or step S40, steps S42 to S58 equivalent to steps S12 to S28 in FIG. 7 are performed. If the determination result at step S30 or S42 is negative, or when step S58 is completed, the process is terminated.

Figure 10A:
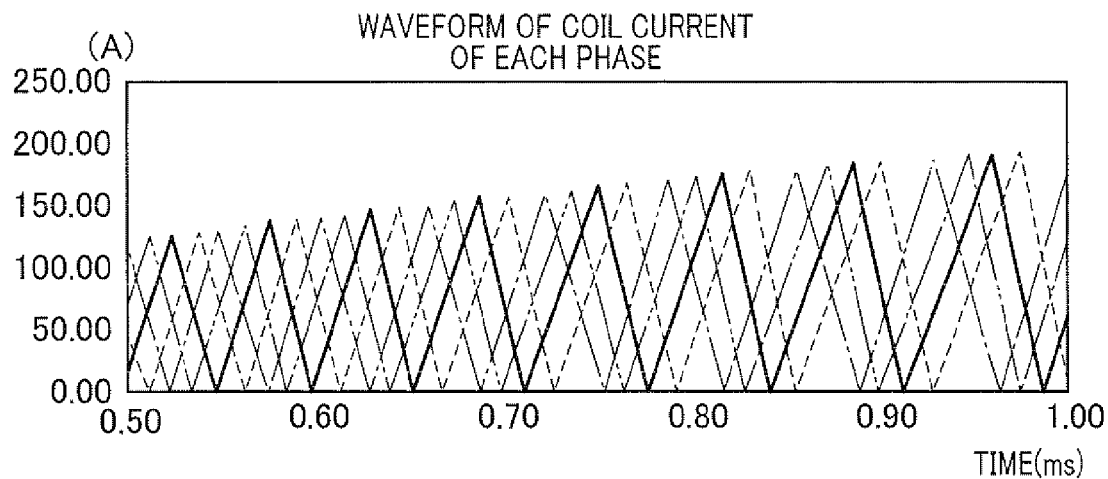
FIGS. 10A to 10C are diagrams showing simulation results of the chopper control in the first embodiment.
Figure 10B:
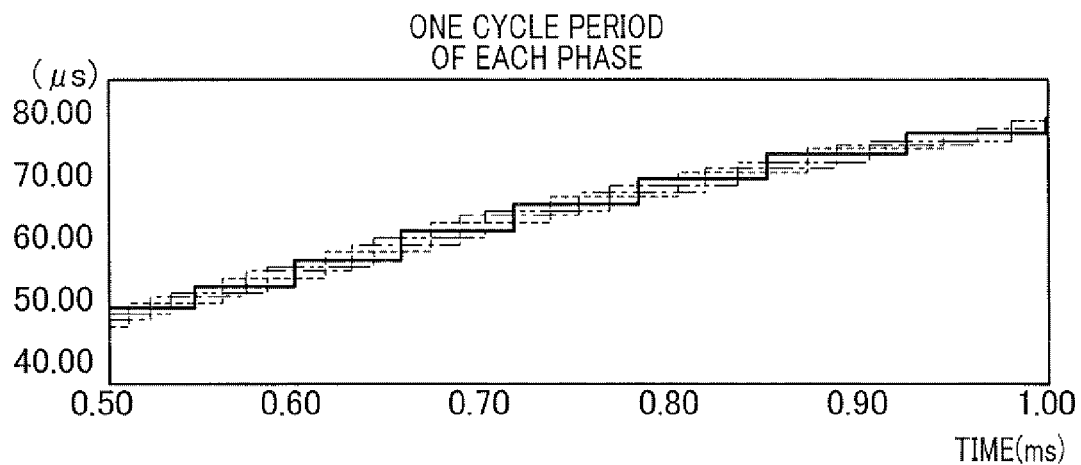
Figure 10C:
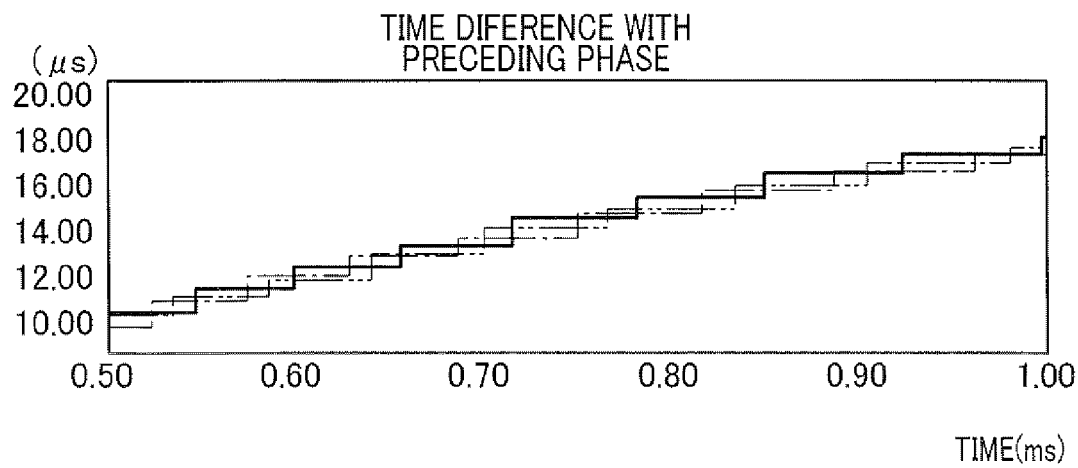

FIGS. 10A to 10C are diagrams showing simulation results of the chopper control of the master and slave phases in a case where the multiphase converter MNV is provided for each of four phases. In more detail, the solid line, dashed line, double-dashed line and broken line in FIG. 10A respectively indicate the currents flowing through the coil Li of each of the four phases, those in FIG. 10B respectively indicate one cycle period of the four phases, and those in FIG. 10C respectively indicate the time difference in the specific timing (the phase time difference) between adjacent two of the four phases.

As shown in these figures, even when the output current is increasing the currents respectively flowing through the coils Li of the four phases peak at nearly even time intervals. In this embodiment, when the cycle period of the master phase increases, the cycle periods of the slave phases increase more than the master phase, and the amount of increase becomes larger as the specific timing becomes later with respect to the master phase. On the other hand, when the cycle period of the master phase decreases, the cycle periods of the slave phases decrease more than the master phase, and the amount of decrease becomes larger as the specific timing becomes later with respect to the master phase. Accordingly, when the peak value of the current of the master phase varies, the peak values of the currents of the slave phases gradually vary such that the variation of the current peak value or the master phase is amplified. Accordingly, the current peak value of the multiphase converters MCV varies smoothly as a whole depending on the variation of the output command value iCc.

FIGS. 11A1, 11A2, 11B1, and 11B2 are diagrams showing other simulation results. In more detail, FIG. 11A shows progressions over time of the currents flowing through the coils Li of the respective phases, and FIG. 11B1 shows progressions over time of a combined current of the currents flowing through the coils Li, and the output current of the multiphase converter MCV. On the other hand, each of FIG. 11A2 and FIG. 11B2 show the cases respectively corresponding to FIG. 11A1 and FIG. 11B1 when the equalizing process explained with reference to FIG. 8 is not performed. As seen from these figures, by performing the equalizing process, the ripple current can be significantly reduced.

The first embodiment described above provides the following advantages.

(1) When the interval between adjacent two of the specific timings of the master phase varies as a result of which the specific timing of another phase deviates from a corresponding one of the timings produced by dividing this interval the on-time period ton (m) is set such that an amount of variation of the interval between adjacent two of the specific timings of this another phase becomes larger than that of the master phase. This makes it possible to reduce the deviation.

(2) The interval between adjacent two of the specific timings of the master phase between which the specific timing of the slave phase is located is predicted on the basis of the currently set one time period ton in accordance with the foregoing equation (c10). This makes it possible to determine the deviation of the specific timing of the slave phase.

(3) The timings produced by evenly dividing the interval between adjacent two of the subsequent specific timings of the master phase are determined on the basis of the currently set on-time period ton of the master phase, and the on-time period is set such that the specific timing of another phase coincides with a corresponding one of the determined timings. This makes it possible to make the specific timing of this another phase coincident with a corresponding one of the timings produced by evenly dividing the interval between adjacent two of the subsequent specific timings of the master phase, if the currently set on-time period ton(1) does not change immediately after it is used to set the specific timing of this another phase.

(4) The timing to switch the switching elements from off-state to on-state in each of the chopper circuits CP is set Lo a timing when the current flowing through the coil Li of each chopper circuit Cp becomes a predetermined value (0 in this embodiment), and on the other hand, the timing to switch the switching elements from on-state to off-state is variably set so as to reduce the above described timing deviation. Accordingly, the switch-on timing can be set with ease, white reducing the above described Liming deviation.

(5) The specific timing which defines a timing at which there starts an increase/decrease cycle in which the absolute value of the current flowing through the coil L1 increases and decreases to control the output voltage Vout is made coincident with the switch-on timing. This makes it possible to use the specific timing as a timing to switch the switching elements between on-state and off-state.

(6) The timing deviation with respect to the divided timings is estimated on the basis of the time difference between the specific timing of the master phase and the specific timing of the slave phase (the time difference Td). This makes it possible to obtain also information about the timing deviation caused by error included in a model used to set the on-time period ton(1) with a high degree of accuracy.

(7) The setting of the on-time period for the slave phase is performed on the basis of the input voltage Vin and the voltage of the capacitor C (the output voltage Vout). This makes it possible to correctly estimate the current flowing through the coil Li, and to properly perform the setting of the on-time period.

(8) A specific one of the chopper circuits CP is selected as the one for the master phase, and the others are used for the slave phases. The master phase is controlled in accordance with the output command value iCc designating the currents outputted from the chopper circuits CP, and the slave phases are controlled according to the control of the master phase. This makes it possible to eliminate interference between the control of the output command value ICc and the equalizing process.

(9) The average value during one cycle of the specific timing of the output current of the master phase (one cycle of switch-on/switch-off operation for control of the output voltage) is controlled in accordance with the output command value ICc. This makes it possible to make the output current coincident with the command value in a short time scale.

(10) The voltage of the capacitor C is controlled by the chopper control at such a value that an AC current flows between the multiphase converters MCV and the motor 10. Since this requires to widely vary the interval of the specific timings, the foregoing equalizing process is valuable in reducing the timing deviation.

Second Embodiment

Next, a second embodiment of the invention is described below with focus on the difference with the first embodiment.

Figure 12:
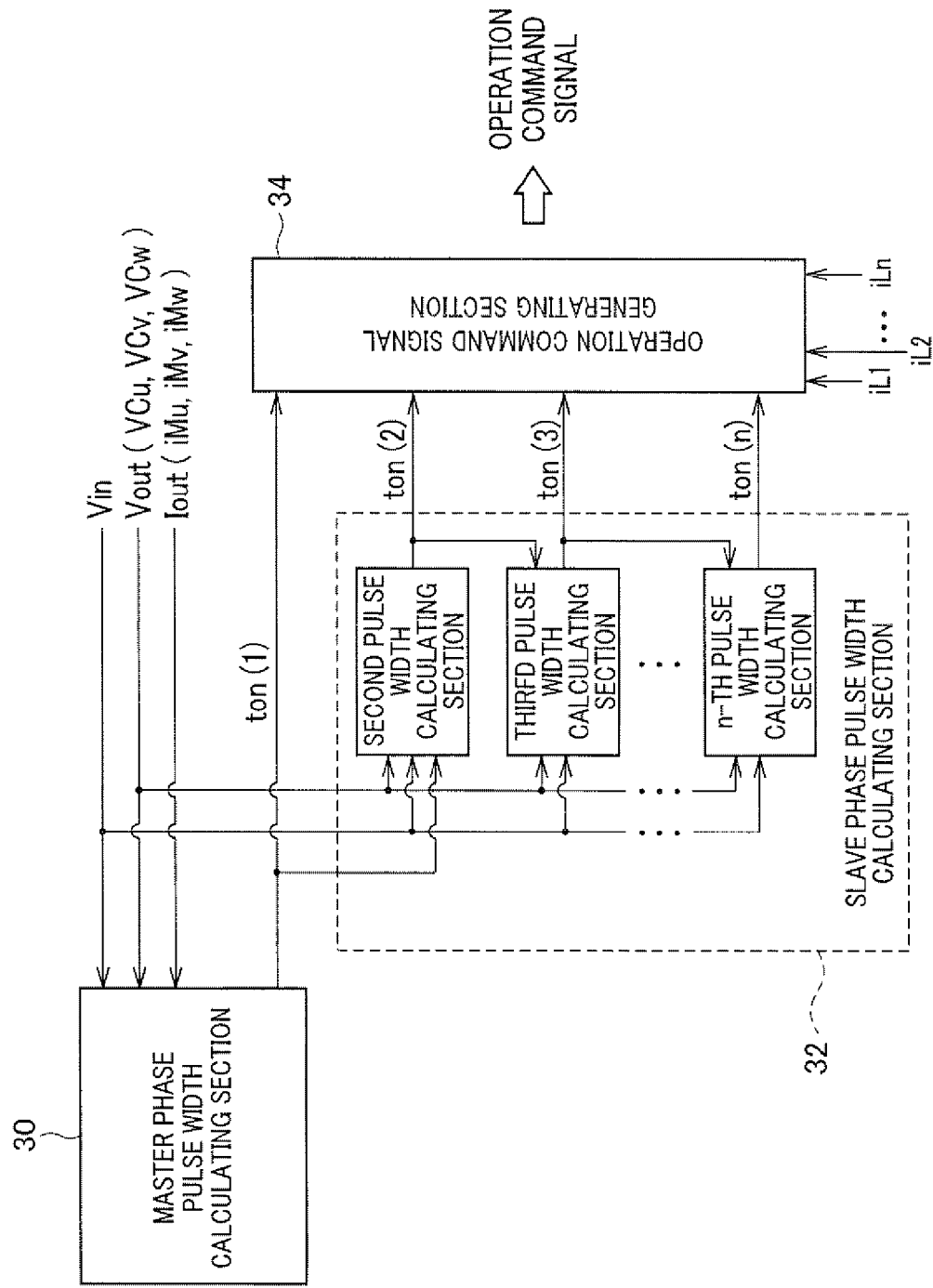
FIG. 12 is a block diagram of a control apparatus of a second embodiment of the invention.

In the second embodiment, the on-time period of the slave phase is set in accordance with the cycle period of the specific timing of the phase whose specific timing immediately precedes that of this slave phase. FIG. 12 is a diagram for explaining the process for producing the operation command signals used to control the multiphase converters MCV of this embodiment. As shown in FIG. 12, the on-time period ton(m) of the m-th phase is set in accordance with the on-time period ton (m−1) of the phase immediately preceding the m-th phase. For example, the on-time period ton(2) of the second phase is set in accordance with the on-time period ton(1) of the master phase, and the on-time period ton(3) of the third phase is set in accordance with the on-time period ton(2) of the second phase.

Figure 13:
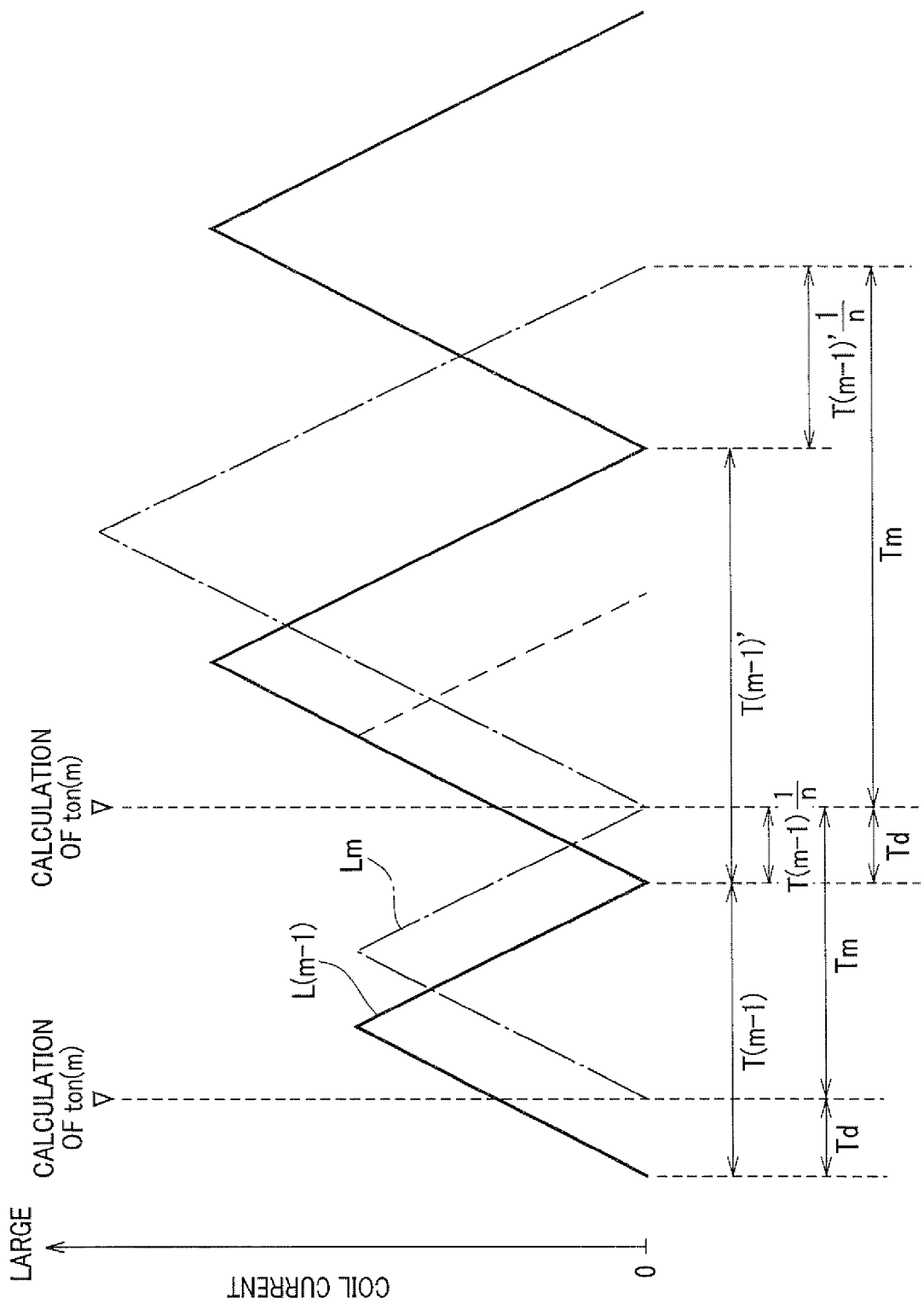
FIG. 13 is a time chart for explaining a chopper control operation for a slave phase performed by the control apparatus of the second embodiment.

Next, a method of setting the on-time period ton(m) of the m-th phase is explained with reference to FIG. 13.

In this figure, the dashed line indicates the current iLm flowing through the coil Lm of the m-th phase, and the solid line indicates the current iL(m−1) flowing through the coil L(m−1) of the immediately preceding phase. FIG. 13 shows a case where the increase/decrease cycle of the current iL(m−1) of the immediately preceding phase increases from T (m−1) to T (m−1)'. In the m-th;phase, to compensate for the timing deviation due to this increase, the on-time period ton (m) is set such that the next cycle period is increased so that the first one of the timings produced by evenly dividing by n the next cycle period T(m−1)' of the immediately preceding phase coincides with the specific timing.

In more detail, the time difference Td between the specific timing of the (m−1)-th phase and the specific timing of the immediately succeeding m-th phase is measured. The next cycle period Tm is set such that the time difference Td plus the next cycle period Tm becomes equal to the present cycle period T(m−1)' of the (m−1)-th phase multiplied by 1/n plus the cycle period T (m−1)'. According to this setting, it is possible to make the next specific timing of the m-th phase coincident with the first one of the timings produced by evenly dividing the interval between adjacent specific timings of the (m−1)-th phase between which the next specific timing of the m-th phase is located, if the next cycle period of the (m−1)-th phase does not change from the present cycle period T(m−1).

Figure 14:
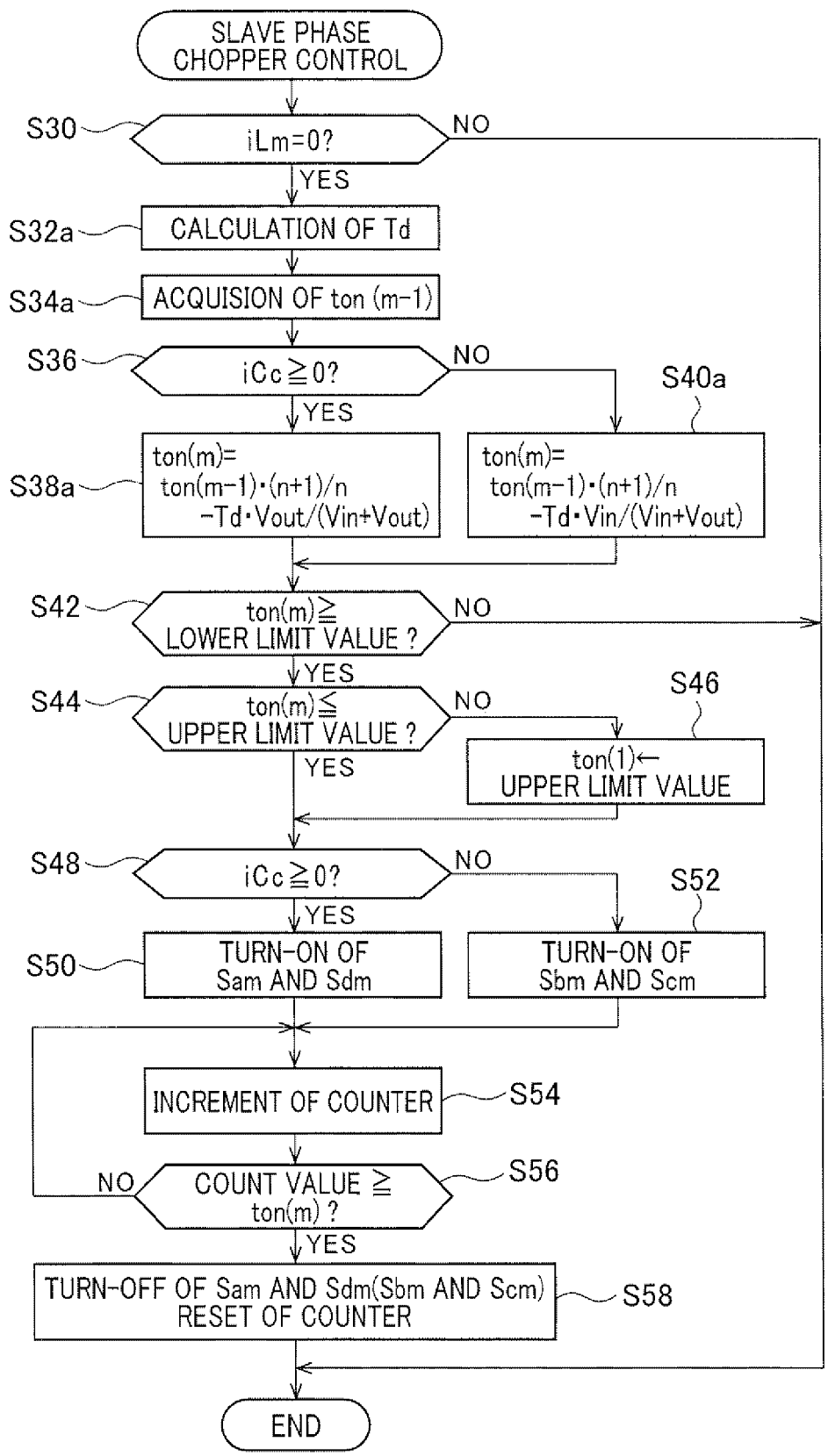
FIG. 14 is a flowchart showing a chopper control process for a slave phase performed by the control apparatus of the second embodiment.

Next, the chopper control process of the slave phase (m-th phase) is explained with reference to the flowchart of FIG. 14. This process is performed at predetermined time intervals by the control apparatus 20. In FIG. 14, the same step numbers as those shown in FIG. 9 denote the same process steps.

In this process, if an affirmative determination is made at step S30, the time difference Td with the specific timing of the immediately preceding phase (the (m−1)-phase) is calculated at step S32a. At subsequent step S34a, the on-time period ton(m−1) of the (m−1)-th phase is acquired. Thereafter, the on-time period ton (m) is calculated at either one of steps S38a and S40a depending on the sign of the output command value ICc.

When the output command value ICc is positive, the on-time period ton(m) is given by the following equation (c13) similar to the equation (c7).

$$ton(m)=ton(m-1)\cdot(n+1)/n-Td\cdot Vout/(Vin+Vout) \qquad (c13)$$

When the output command value ICc is negative, the on-time period ton(m) is given by the following equation (c14) similar to the equation (c12).

$$ton(m)=ton(m-1)\cdot(n+1)/n-Td\cdot Vin/(Vin+Vout) \qquad (c14)$$

When step S38a or step S40a is completed, steps S42 to S58 are performed.

According to the above described second embodiment, advantages similar to the advantages provided by the first embodiment can be provided.

Third Embodiment

Next, a third embodiment of the invention is described below with focus on the difference with the first embodiment.

Figure 15:
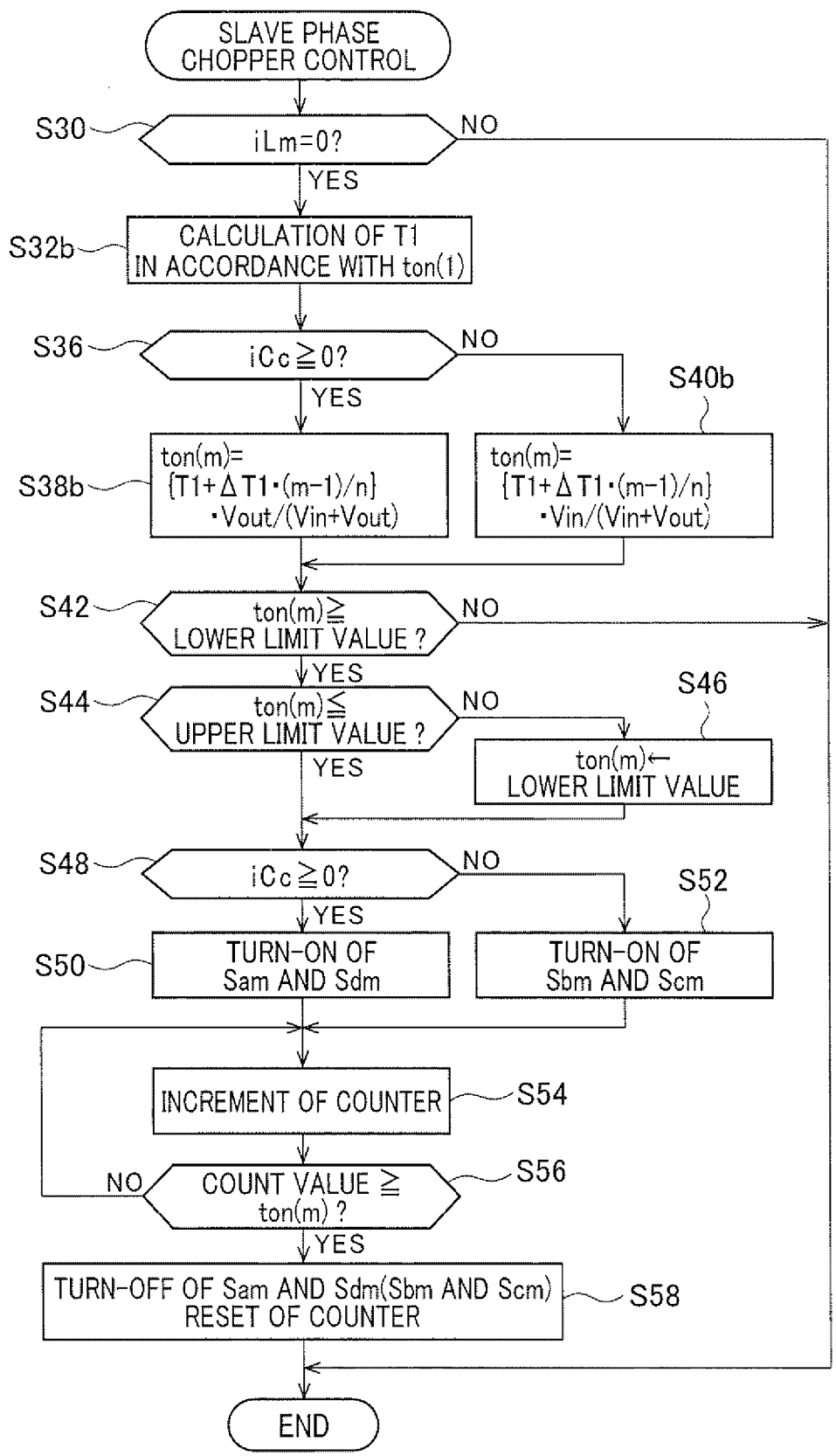
FIG. 15 is a time chart for explaining a chopper control process for a slave phase performed by a control apparatus of a third embodiment of the invention.

In this embodiment, the variation of the cycle period of the specific timing of the master phase is estimated on the basis of the variation of the on-time period ton(1) of the master phase, and the on-time period ton (m) of the slave phase is set in accordance with the estimated variation. The chopper control process of the slave phase (m-th phase) is explained in the following with reference to the flowchart of FIG. 15. This process is performed at predetermined time intervals by the control apparatus 20. In FIG. 15, the same step numbers as those shown in FIG. 9 denote the same process steps.

In this process, if an affirmative determination is made at step S30, the cycle period T1 of the specific timing of the master phase is calculated on the basis of the on-time period ton(1) of the master phase at step S32b. Thereafter, the on-time period ton (m) is calculated at either one of steps S38b and S40b depending on the sign of the output command value ICc.

When the output command value ICc is positive, the on-time period ton(m) is given by the following equation (c15).

$$ton(m)=\{T1+\Delta T1\cdot(m-1)/n\}\cdot Vout/(Vin+Vout) \qquad (c15)$$

In the equation (c15), the term "$\Delta T1\cdot(m-1)\cdot Vout/\{(Vin+Vout)\cdot n\}$" is for eliminating the timing deviation which occurs when the specific timing of the m-th phase deviates from a corresponding one of the timings produced by evenly dividing the interval between adjacent specific timings of the master phase depending on the variation amount $\Delta T1$ of the cycle period T of the master phase. That is, when the cycle period T of the master phase varies by an amount of $\Delta T1$, the specific timing of the m-th phase deviates by an amount of "$\Delta T1\cdot(m-1)/n$". The variation of the on-time period needed to compensate for this deviation is equal to "$\Delta T1\cdot(m-1)\cdot Vout/\{(Vin+Vout)\cdot n\}$"

Likewise, when the output command value ICc is negative, the on-time period ton(m) is given by the following equation (c16).

$$ton(m)=\{T1+\Delta T1\cdot(m-1)/n\}\cdot Vin/(Vin+Vout) \qquad (c16)$$

When step S38a or step 40a is completed, steps S42 to S58 are performed.

According to this embodiment, advantages similar to the advantages (1) to (5) and (7) to (10) provided by the first embodiment can be provided.

Fourth Embodiment

Next, a fourth embodiment of the invention is described below with focus on the difference with the first embodiment.

Figure 16:
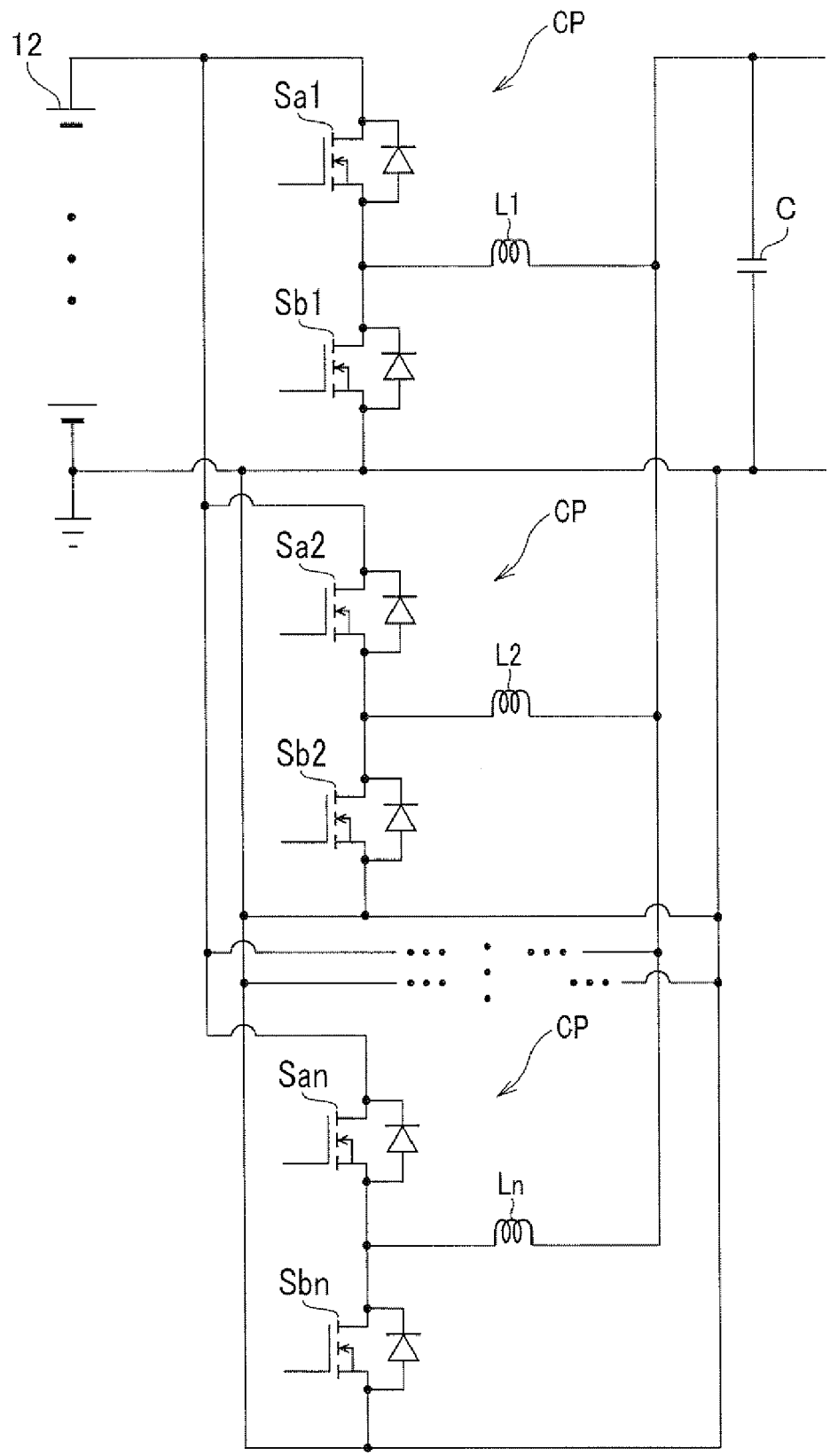
FIG. 16 is a diagram showing a circuit structure of multiphase converters included in a power conversion system including a control apparatus of a fourth embodiment of the invention.

FIG. 16 is a diagram showing a structure of multiphase converters MCV used in the fourth embodiment. In this embodiment, each of the multiphase converters MCV, which serves as a back converter for stepping down the voltage of the high voltage battery 12 and accumulating it in a capacitor C, includes n chopper circuits CP disposed between the capacitor C and the high voltage battery 12. In more detail, each of the chopper circuits CP is constituted by a series connection of a switching element Sai (i being an integer from 1 to n) and a switching element Sbi parallel-connected to the high voltage battery 12, and a coil Li connected between a connection node of the switching elements Sai and Sbi and the capacitor C.

Next, the chopper control in this embodiment is explained with reference to FIGS. 17A to 17D each showing one of the chopper circuits CP. In FIGS. 17A to 17D, it is assumed that the amount of charge moving between terminals of the multiphase converter MCV and the motor 10 is negligibly small for ease of explanation.

Figure 17A:
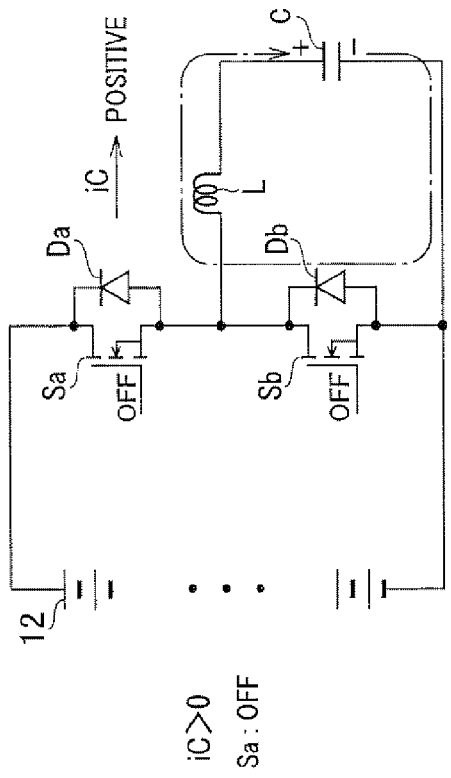
FIGS. 17A to 17D are diagrams for explaining operation of one of the chopper circuits constituting the multiphase converter in the fourth embodiment.
Figure 17B:
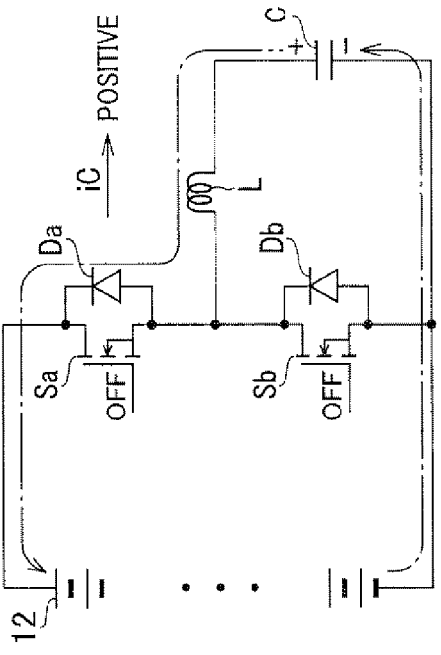

First, explanation is given for the case where the sign of the output current is positive with reference to FIGS. 17A and 17B. As shown in FIG. 17A, when the switching element Sa is turned on, a current flows through a closed loop circuit constituted by the high voltage battery 12, switching element Sa and capacitor C. As a result, the capacitor C is charged. Thereafter, as shown in FIG. 17B, when the switching element Sa is turned off, a current flows through a closed loop constituted by the coil L, capacitor C and diode Db parallel connected to the switching element Sb. As a result, the capacitor C is further charged.

Figure 17C:
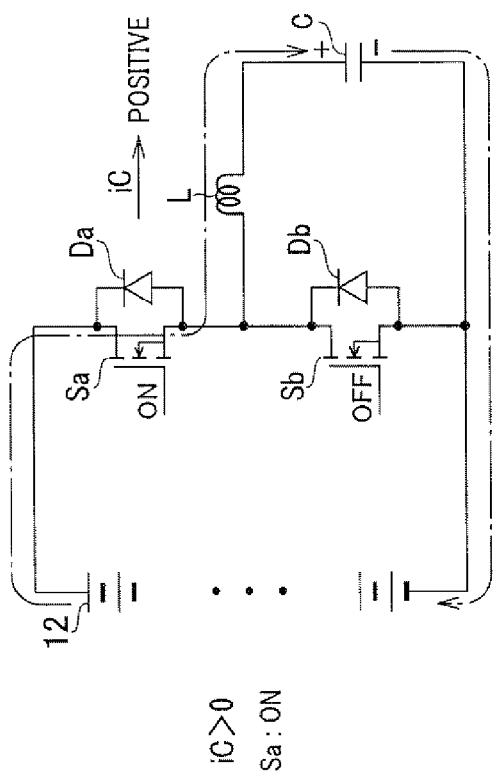
Figure 17D:
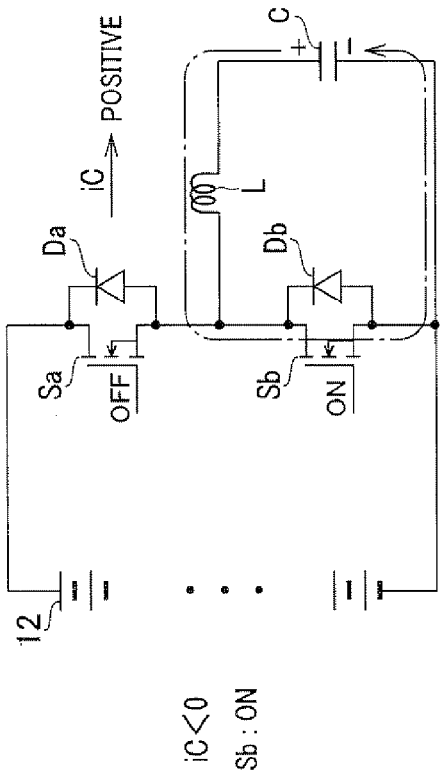

Next, explanation is given for the case where the sign of the output current is negative with reference to FIGS. 17C and 17D. As shown in FIG. 17C, when the switching element Sb is turned on, a current flows through a closed loop circuit constituted by the capacitor C, coil L, and switching element Sb. As a result, the capacitor C is discharged. Thereafter, as shown in FIG. 17D, when the switching element Sb is turned off, a current due to a back electromotive force of the coil L flows through a closed loop constituted by the coil L, diode Da parallel-connected to the switching element Sa, high voltage battery 12, and capacitor C.

Next, the chopper control process of the master phase in this embodiment is explained with reference to FIGS. 18A and 18B.

As shown in FIGS. 18A and 18B, in this embodiment, the switching elements Sa1 and Sb1 are switched from on-state to off-state when the absolute value of the current flowing through the coil L1 reaches a peak value Ip, and switched from off-state to on-state when the absolute value of the current flowing through the coil L1 becomes 0. The peak value Ip is set to 2/n of the output command value iCc, so that the output current of the mater phase integrated during one cycle period of switch-on/switch-off operation of the switching elements Sa1 and Sb1 becomes equal to 1/n of the output command value iCc integrated during the same period.

Figure 19:
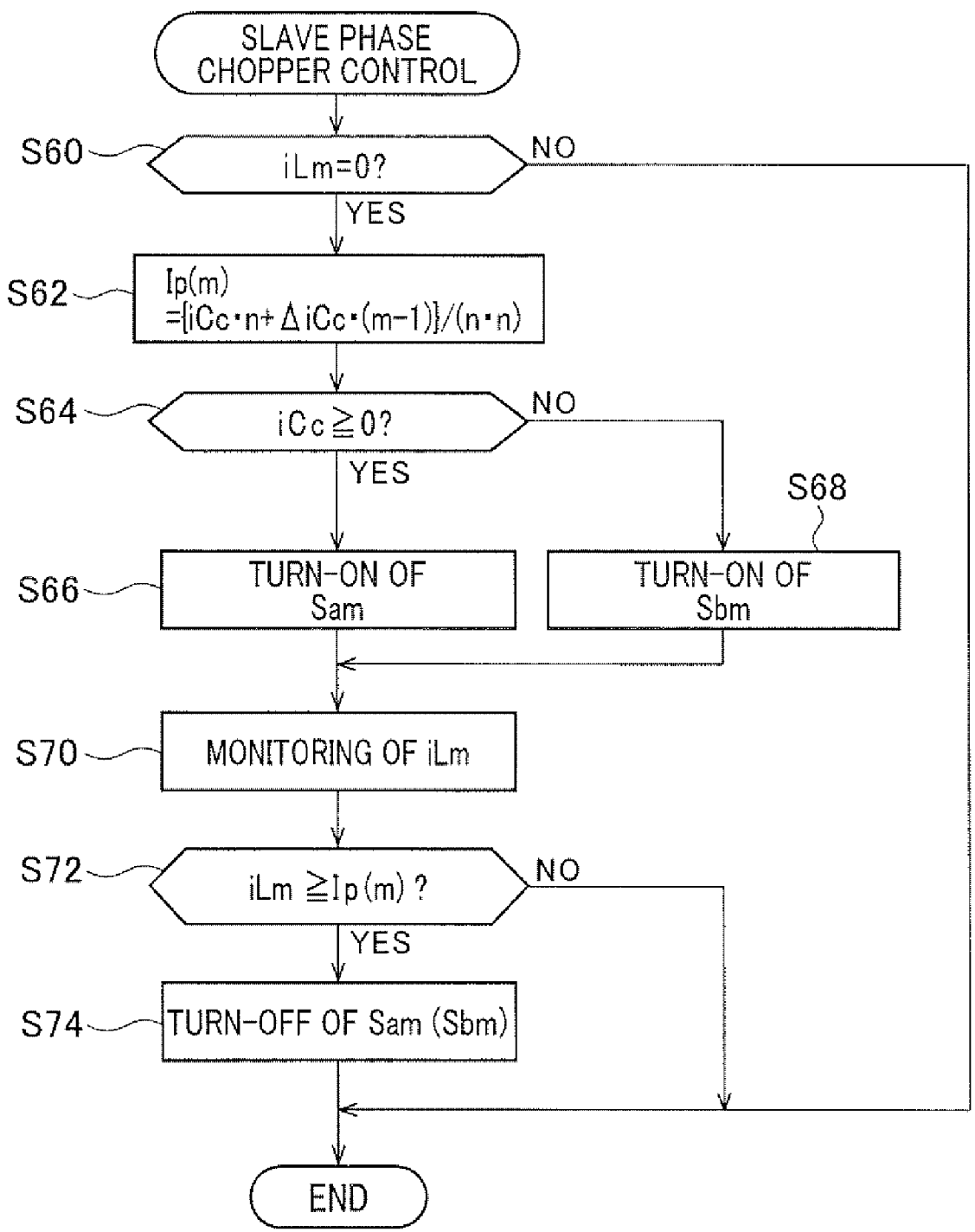
FIG. 19 is a flowchart showing a chopper control process for a slave phase performed by the control apparatus of the fourth embodiment of the invention.

Next, the chopper control process of the slave phase (the m-th phase) is explained with reference to the flowchart of FIG. 19. This process is performed at predetermined time intervals by the control apparatus 20.

This process begins by determining at step S60 whether or not the current iLm flowing through the coil L1 is 0. If the determination result at step S60 is affirmative, the process proceeds to step S62 where the peak value IP is calculated in accordance with the following equation (c17).

$$Ip(m) = \{iCc \cdot n + \Delta iCc \cdot (m-1)\}/n \cdot n \quad (c17)$$

In this equation, the term "$\Delta iCc \cdot (m-1)/n \cdot n$" is a term for compensating for the timing deviation which may occur when the cycle period of the master phase varies, and as a result, the specific timing of the m-th phase deviates from a corresponding one of the timings produced by evenly dividing the cycle period. For example, when the peak value Ip varies by an amount of $\Delta Ip$, the cycle period of the master phase varies by an amount of $\Delta Ip \cdot L \cdot (Vout+Vin)/Vin \cdot Vout$. In this case, the specific timing of the m-th phase deviates from a corresponding one of the evenly divided timings by an amount of $\{(m-1)/n\} \cdot \{\Delta Ip \cdot L \cdot (Vout+Vin)/Vin \cdot Vout\}$. To compensate for this timing deviation, it is necessary to vary the peak value Ip by an amount of $\{(m-1)/n\} \cdot \Delta Ip$ in the m-th phase. Here, the deviation amount $\Delta Ip$ of the peak value Ip and the deviation amount $\Delta iCc$ of the output command value iCc are in a relationship of $\Delta Ip = \Delta iCc/n$. Accordingly, the peak value of the m-th phase has to be varied from the peak value iCc/n of the master phase by an amount of $\Delta iCc \cdot (m-1)/n \cdot n$.

After the peak value Ip is calculated at step S62, the process proceeds to step S64 to determine whether or not the output command value iCc is equal to or larger than 0. If the determination result at step S64 is affirmative, the switching element Sam is turned on at step S66. If the determination result at step S64 is negative the switching element Sbm is turned on at step S68. After completion of step S66 or step 368, the process proceeds to step S70 to monitor the current iLm flowing through the coil iLm. At subsequent step S72, it is determined whether or not the current iLm is equal to or larger than the peak value Ip. If the determination result at step S72 is affirmative, the switching element Sam or Sbm is turned off at step S74. If the determination result at step S60 or S72 is negative, or when step S74 is completed, the process is terminated.

According to this embodiment, advantages similar to the advantages (1) to (5) and (7) to (10) provided by the first embodiment can be provided.

It is a matter of course that various modifications can be made to the above described embodiments as described below.

The second embodiment may be modified in the same way in which the third or fourth embodiment is modified from the first embodiment.

In the first to fourth embodiments, the equalizing process is performed on the basis of the output voltage Vout and the input voltage Vin. However it is not limited thereto. For example, since the variation of the current flowing through the coil L is a parameter having a correlation with the output voltage Vout and the input voltage Vin, it is possible to perform the equalizing process on the basis of the variation of the current flowing through the coil L by rewriting the equations (c7) and (c12) to (c17). For another example, if the high voltage battery 12 can be regarded as a stabilized power supply, it is not necessary to detect the input voltage Vin because it can be regarded as a constant voltage.

In the above embodiments, the on time period ton (1) is set such that the output current of the master phase becomes equal to iCc/n, however, it is not limited thereto. In the above embodiments, if the period of the increase/decrease cycle of the current flowing through the coil L1 (the cycle period of the specific timing) varies depending on the variation of the output command value iCc, the output current of the chopper circuit CP of each slave phase does not become equal to 1/n of the output command value iCc. Accordingly, as the number of the chopper circuits increases, the controllability of the output current may be lowered. In view of this, the on-time period ton(1) of the master phase may be set on the basis of the variation of the output command value iCc. In this case, when the cycle period varies in accordance with the variation of the on-time period ton(1) of the master phase, since the cycle period of the slave phase is varied such that this variation is amplified by the equalizing process, it is possible to estimate the variation of each slave phase due to the equalizing process on the basis of the variation of the cycle period of the master phase. On the other hand, the ultimate cause of variation of the on-time period ton (1) of the master phase can be deemed to be variation of the output command value ICc. Accordingly, in view of the fact that when the output command value iCc varies as a result of which the cycle period of the master phase varies depending on the variation of the output command value iCc, the cycle period of each slave phase varies due to the equalizing process, it is also advantageous to set the on-time period ton (1) of the master phase such that the variations of the output current of the master phase and the slave phases become equal to the variation one the output command value iCc.

Figure 20:
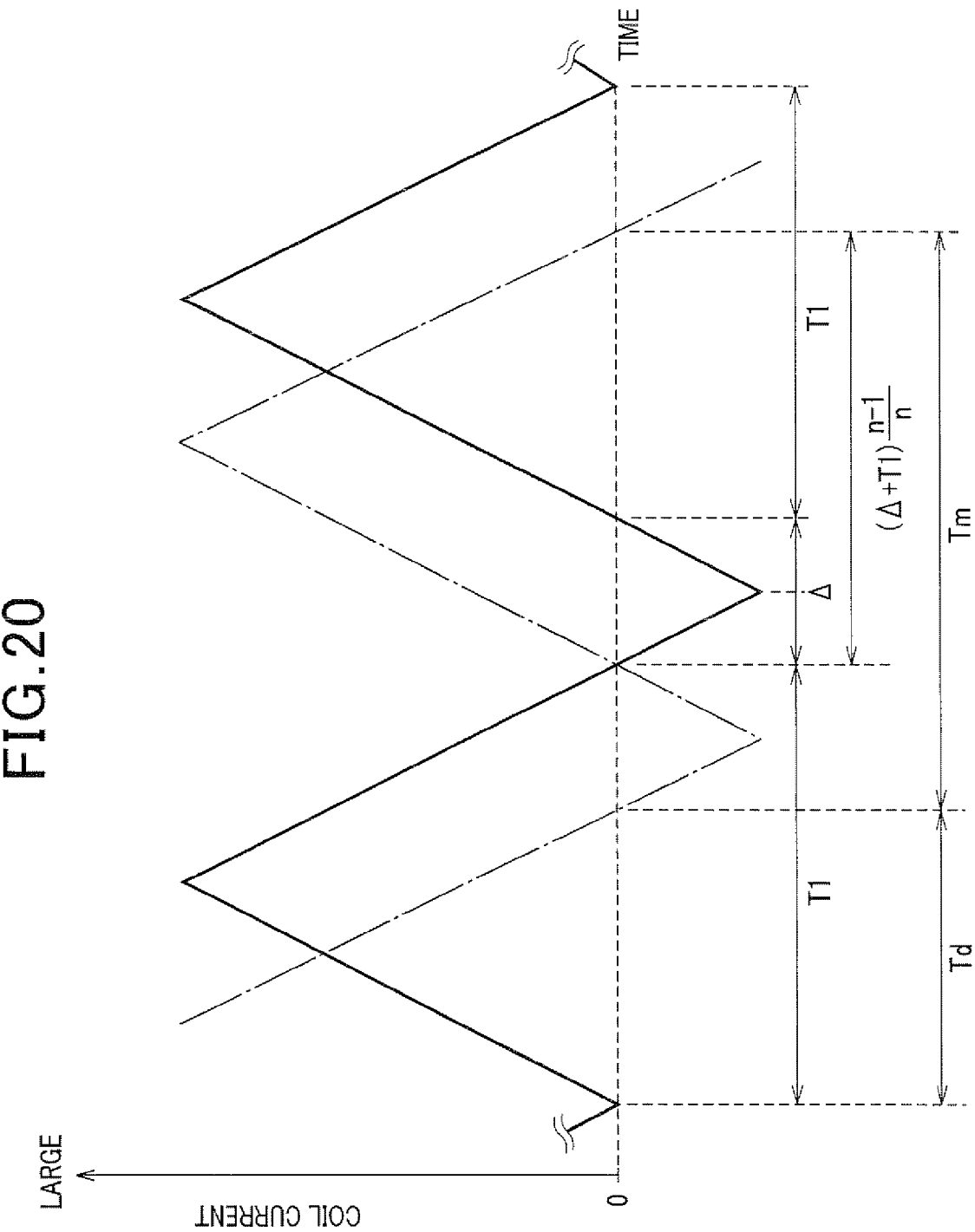
FIG. 20 is a time chart for explaining a chopper control process for a slave phase performed by a control apparatus of a modification of the fourth embodiment.

In the above embodiments, the switching elements Sai and Sdi (or Sbi and Sci) are turned on when the absolute value of the current flowing through the coil Li gradually decreases and becomes 0 for the first time. However, it is not limited thereto. For example, as shown in FIG. 20, the above embodiments may be so modified that after the absolute value of the current flowing through the coil Li gradually decreases and becomes 0, a current is passed to the coil Li in the opposite direction, and the switching elements Sai and Sdi (or Sbi and Sci) are turned on when the absolute value of this current gradually decreases and becomes 0. According to this modification, it is possible to discharge a parasitic capacitor between input and output terminals of each of the switching elements Sai and Sci disposed on the high side. Incidentally, the switching process of the switching elements shown in FIG. 20 is different from that shown in FIG. 8 in that at the time of calculating the next cycle period Tm of the m-th phase, instead of the cycle period T1 of the master phase, the cycle period T1 plus a time period Δ in which the coil current iL1 flows in the opposite direction is multiplied by (m−1)/n.

In the above embodiments, although a timing at which the current flowing through the coil Li becomes 0 is used as the timing to switch the switching elements from off-state to on-state, a timing at which the current flowing through the coil Li becomes a predetermined value other than 0 may be used instead.

In the above embodiments, a timing at which the current flowing through the coil Li becomes a predetermined value is used as the timing to switch the switching elements from on-state to off-state. However, it is not limited thereto. For example, the above embodiments may be so modified that a timing at which the current flowing through the coil L1 becomes a predetermined value is used as the timing to switch the switching elements from on-state to off-state, and a timing at which the current flowing through the coil Li becomes a value variably set depending on the output command value iCc is used as the timing to switch the switching elements from off-state to on-state.

In the above embodiments, at least one of the timing to turn on the switching elements and the timing to turn oft the switching elements is set to a timing at which the current flowing through the coil Li becomes a predetermined value, the interval between adjacent two timings at each of which the current in a specific one of the chopper circuits OP becomes a predetermined value is evenly divided to produce divided timings, and the divided timings are allocated to other chopper circuits CP. However, the above embodiments may be so modified that if it is determined that the timing to switch the switching elements deviates from a corresponding one of the evenly divided timings when the current flowing through the coil Lm (m being from 2 to n) becomes 0 in the equalizing process explained with reference to FIG. 8, there may be additionally performed a process to cause the current flowing through the coil Lm to become 0 again at a timing closer to the corresponding one of the evenly divided timings than the timing to switch the switching elements bypassing a current in the opposite direction to the coil Lm in the way explained with reference to FIG. 20. In this case, the timing to switch the switching elements from off-state to on-state is not limited to the timing at which the current flowing through the coil Lm becomes 0.

In the above embodiments, when the timing of the next switch-on operation (the timing at which the current flowing through the coil Lm becomes 0) deviates from a corresponding one of the evenly divided timings, the on-time is set such that the deviation reduces to 0. However, the timing deviation can be reduced simply by setting the cycle period of the m-th phase between the cycle period Tm and the cycle period T1'. In this case, however, it is desirable that when the cycle period T1 of the master phase comes to not vary, the cycle period of each slave phase is set so as to converge to the cycle period T1 of the master phase. When the cycle period T1 of the master phase varies only a certain number of times, it is more strongly desired that the cycle period of each slave phase coincides with the cycle period T1 of the master phase.

In the above embodiments, a specific one of the chopper circuits CP is selected as that of the master phase. However, if it is determined that the timing deviation is larger than a predetermined level when any of the chopper circuits CP is controlled in accordance with the output command value iCc, the chopper circuit CP whose on-time period has been set immediately before the on-time period is set for another chopper circuit CP at the time when the above determination is made may be set as that of the master phase, and the other chopper circuits CP may be set as those of the slave phases until the timing deviation decreases below the predetermined level.

The method of feedback control on the output voltage Vout is not limited the one that uses proportional control. For example, it may be the one that uses proportional integration control, or proportional integration derivation control.

The method of calculating the output command value iCc is not limited to the one that uses the difference between the command voltage Vc and the output voltage Vout. For example, in view of the fact that the variation of the command voltage Vc has a correlation with an amount of charge required to be charged in the capacitor C, the output command value iCc may be calculated on the basis of the variation of the command voltage Vc. Also in this case, the output command value iCc can be calculated correctly by taking account of the present phase currents iMu, iMv and iMw even when a power factor is varied in order to control the motor 10. Furthermore, the open loop control in the above embodiments may be such that the voltage of the capacitor C is calculated on the basis of the present output current Iout, previous output command value iCc and capacitance of the capacitor C, and a feedforward control is performed in order that the calculated voltage of the capacitor C becomes equal to the command voltage Vc. This feedforward control maybe performed in conjunction with a feedback control to correct the feedforward control.

The method of calculating the output command value iCc on the basis of the command voltage Vc is not limited to the one that uses the phase currents of the motor 10 as direct parameters. For example, if the power factor is fixed while the motor 10 is controlled, since the command voltage Vc includes information on the phases of the currents flowing through the motor 10, it is possible to calculate the output command value iCc on the basis of only the command voltage Vc without using the values of the currents flowing through the motor 10 as direct input parameters.

Figure 21:
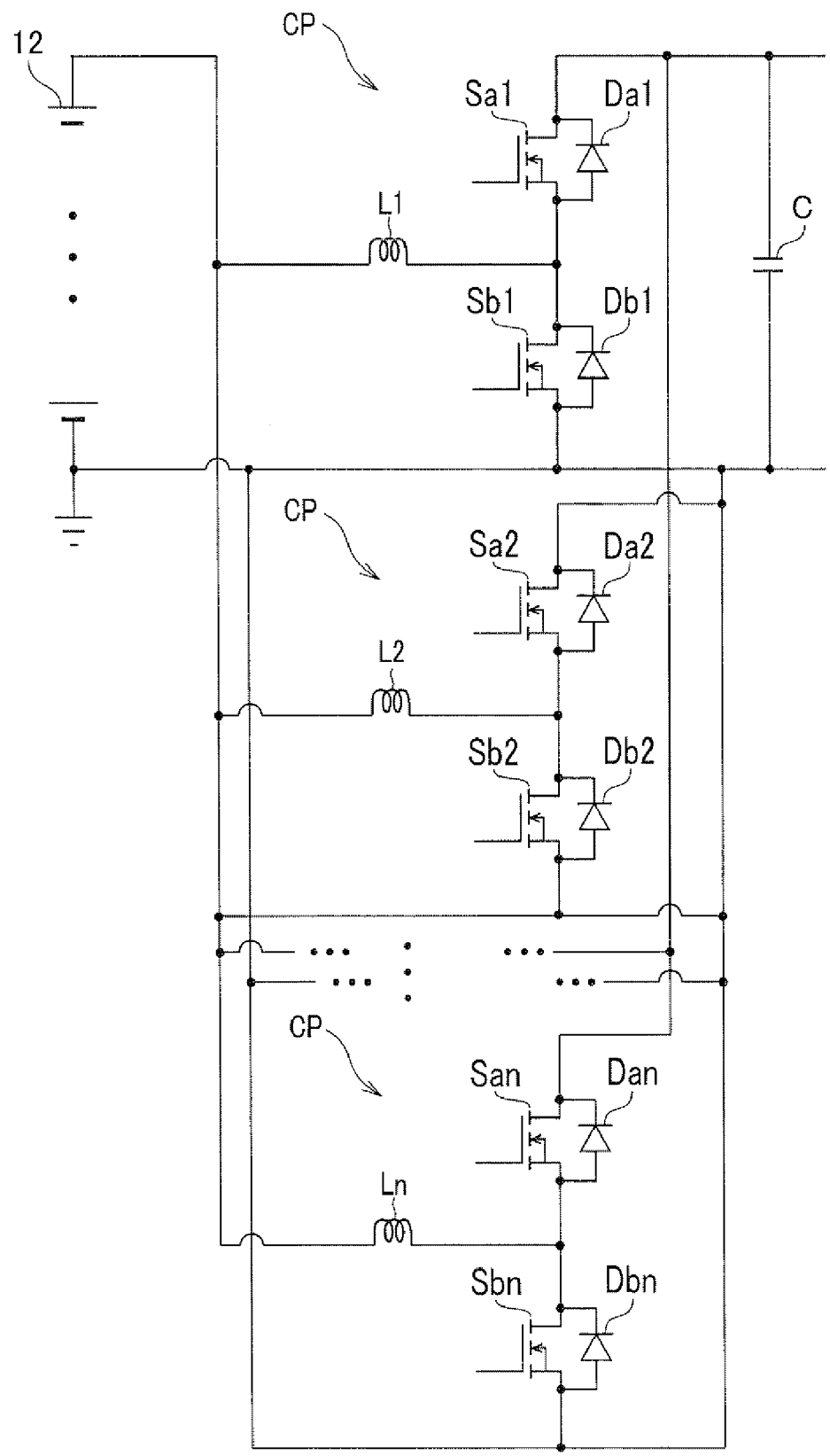
FIG. 21 is a diagram showing a circuit structure of multiphase converters included in a modification of the control apparatus usable in the above embodiments of the invention.
Figure 22:
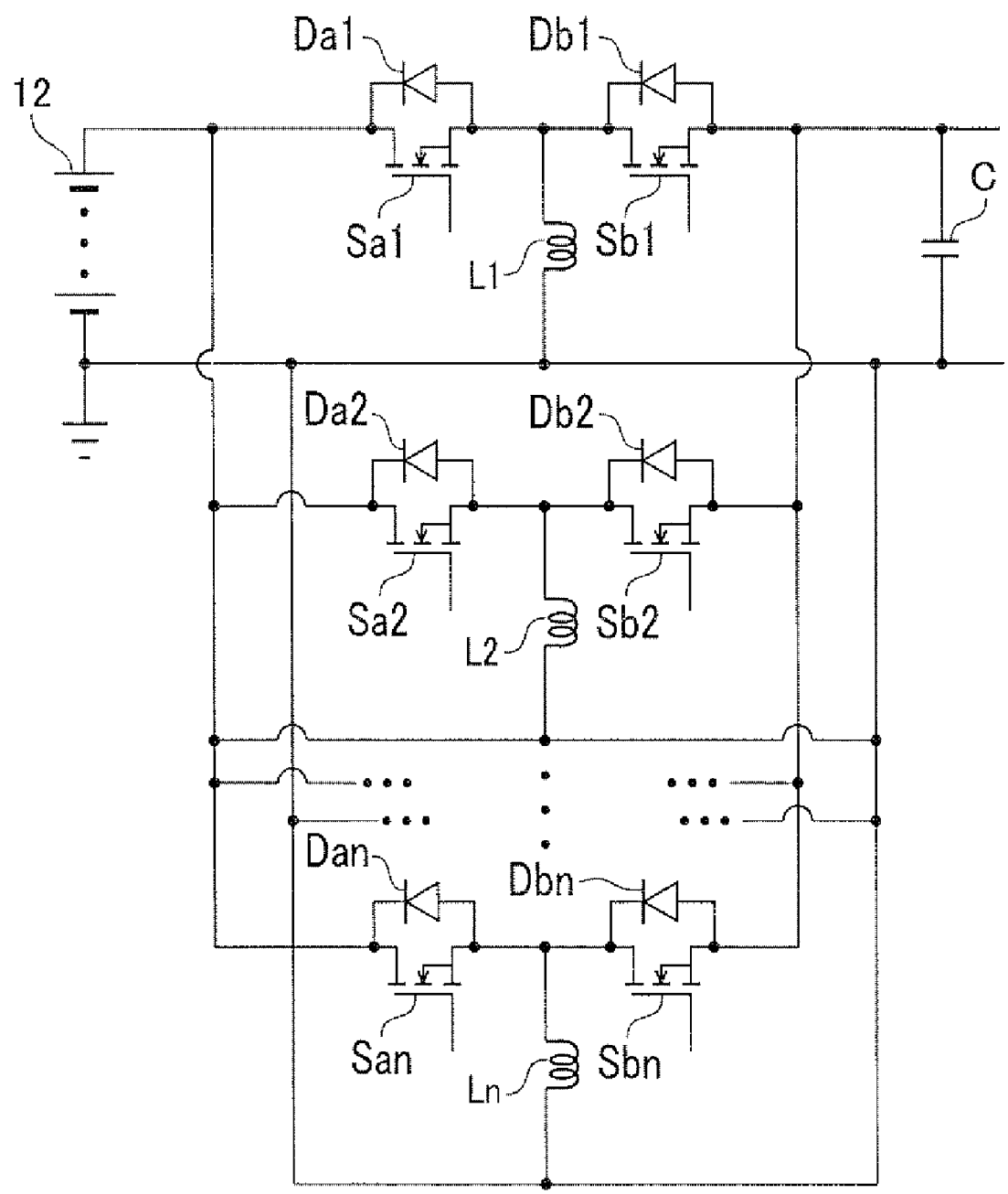
FIG. 22 is a diagram showing a circuit structure of multiphase converters included in another modification of the control apparatus usable in the above embodiments of the invention.

The converter of the non-insulation type is not limited to the one described in the above embodiments. For example, it may be a step up converter as shown in FIG. 21. The step-up converter shown in FIG. 21 includes n ($\geq 2$) chopper circuits CP each of which is constituted by a series connection of switching elements Sai and Sbi parallel-connected to the high voltage battery 12, a coil L1 connected between the connection node of the switching elements Sai and Sbi and the capacitor C, and diodes Da1 and Db2 respectively parallel-connected to the switching elements Sai and Sbi. For another example, it may be a back-boost converter as sown in FIG. 22. The back-boost converter shown in FIG. 22 includes n ($\geq 2$) chopper circuits CP each of which is constituted by a series connection of switching element Sai and Sbi connecting the positive terminal of a high voltage battery 12 to one electrode of a capacitor C, a coil Li connecting the connection node of the switching element Sai and Sbi to the negative terminal of the high voltage battery 12 and the other terminal of the capacitor C, and diodes Da1 and Db2 respectively parallel-connected to the switching elements Sai and Sbi.

The TCV (three phase converter) is not limited to the one that includes non-insulation type converters connected to the respective phases of the motor 10. For example, it may be of the type which includes insulation-type converters.

The motor 10 is not limited to a three-phase motor. For example, it may be a single-phase motor, or a 5-phase motor. In this case, instead of the TCV, a power conversion circuit including a multiphase converter for each phase of the motor is used. Furthermore, the above embodiments may be used to control not a motor but an alternator.

In the above embodiments, the TCV is connected to the motor as a drive power generating apparatus of a hybrid vehicle. However the present invention is applicable to an electric rotating machine mounted on an electric vehicle.

In the above embodiments, the TCV is used to supply power to a motor mounted on a vehicle as a drive power generating apparatus. However, the present invention is applicable to a TCV used to supply power to a motor of an air-conditioning apparatus mounted on a vehicle.

Furthermore, the present invention is applicable to a power conversion apparatus used to supply power to an uninterrupted power supply (UPS) which outputs an AC power supply voltage. The present invention is also applicable to a DC/DC converter connected between a high voltage battery and an inverter supplying power to an electric rotating machine mounted on a vehicle.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for a power conversion apparatus including a plurality of chopper circuits and a capacitor, each of said chopper circuits including a switching circuit and a coil, said switching circuit being applied with an input voltage and on/off-controlled in accordance with specific timings determined by a value and a sign of variation of a current flowing through said coil to create a required voltage in said capacitor through said coil, said control apparatus comprising:
 a first function of evenly dividing a first interval between adjacent two of said specific timings of a selected one of said chopper circuits to produce divided timings to be allocated to the other chopper circuits; and
 a second function of setting, for each of the other chopper circuits, an on-time period of said switching circuit such that, when said first interval varies by a first amount as a result of which said specific timing of each of the other chopper circuits deviates from a corresponding one of said divided timings, a second interval between adjacent two of said specific timings of each of said other chopper circuits is varied by a second amount, said second variation amount being larger than said first variation amount to reduce deviation between said specific timing of each of said other chopper circuits and said corresponding one of said divided timings.

2. The control apparatus according to claim 1, wherein said second function is configured to predict said first interval on the basis of an on-time period of said switching circuit presently set for said selected one of said chopper circuits, and to estimate said deviation on the basis of said predicted first interval.

3. The control apparatus according to claim 1, wherein said second function is configured to set said second interval such that said second interval approaches said first interval when said first interval does not vary.

4. The control apparatus according to claim 1, wherein said second function is configured to estimate, on the basis of a presently set on-time period of said switching circuit of said selected on of said chopper circuits, said divided timings to be produced next time within said specific timing of said selected one of said chopper circuits which is to be determined next time, and to set an on-time period of said switching circuit of said selected one of said chopper circuits such that said specific timing of each of said other chopper circuits coincides with a corresponding one of said estimated divided timings.

5. The control apparatus according to claim 1, wherein in each of said chopper circuits one of a first timing to switch said switching circuit from on-state to off-state and a second timing to switch said switching circuit from off state to on-state is set to a timing at which a current flowing through said coil becomes a predetermined value, and said second function is configured to reduce said deviation by variably setting one of said first and second timings.

6. The control apparatus according to claim 1, wherein said specific timing is a timing at which said current flowing through said coil becomes said predetermined value.

7. The control apparatus according to claim 5, wherein said second function is configured to variably set said second timing in order that said first timing following said second timing coincides with a corresponding one of said divided timings.

8. The control apparatus according to claim 1, wherein said second function is configured to measure a time difference between said specific timing of said selected on of said chopper circuits and said specific timing of one of said other chopper circuits, and estimate said deviation on the basis of said measured time difference.

9. The control apparatus according to claim 1, wherein said second function is configured to set said on-time period in accordance with said input voltage and a voltage of said capacitor.

10. The control apparatus according to claim 1, wherein a specific one of said chopper circuits is set as a master circuit, and the other chopper circuits are set as slave circuits, said control apparatus further comprising a third function calculating a command value designating an output current of said chopper circuits, and a fourth function of on/off-controlling said switching circuit of said master circuit in accordance with said calculated command value,
 said second function setting said on-time period for each of said slave circuits.

11. The control apparatus according to claim 10, wherein said selected one of said chopper circuits is said master circuit.

12. The control apparatus according to claim 10, wherein said slave circuits are sequentially ordered in terms of chronological sequence of appearance of said specific timings thereof following appearance of said specific timing of said master circuit.

13. The control apparatus according to claim 10, wherein said fourth function is configured to control an average value of an output current of said master circuit during a cycle period of said specific timing of said master circuit on the basis of said command value.

14. The control apparatus according to claim 1, wherein a voltage of said capacitor is controlled such that an AC current flows between said power conversion apparatus and an electrical load connected to said power conversion apparatus.

15. The control apparatus according to claim 14, wherein said capacitor is connected to one of input terminals of an electric motor as said electrical load.

16. The control apparatus according to claim 1, wherein said power conversion apparatus includes a non-insulation type converter.

17. The control apparatus according to claim 16, wherein said non-insulation type converter is a back converter which includes, as said switching circuit, a series connection of switching elements parallel-connected to input terminals of said power conversion apparatus across which said input voltage is applied, a connection node of said switching elements being connected to one terminal of said capacitor through said coil.

18. The control apparatus according to claim 16, wherein said non-insulation type converter is a boost converter which includes, as said switching circuit, a series connection of switching elements parallel-connected to said capacitor, a connection node of said switching elements being connected to an input terminal of said power conversion apparatus to which said input voltage is applied.

19. The control apparatus according to claim 16, wherein said non-insulation type converter is a back-boost converter which includes, as said switching circuit, a series connection of switching elements which connects one input terminal of said capacitor to one input terminal of said power conversion apparatus to which said input voltage is applied, a connection node of said switching elements being connected, through said coil, to the other terminal of said capacitor and the other input terminal of said power conversion apparatus which is grounded.

20. The control apparatus according to claim 16, wherein said non-insulation type converter is a back-boost converter which includes, as said switching circuit, a first series connection of switching elements parallel-connected to input terminals of said power conversion apparatus across which said input voltage is applied, a second series connection of switching elements parallel-connected to said capacitor, a connection node of said switching elements of said first series connection and a connection node of said switching elements of said second series connection being connected to each other through said coil.

21. A power conversion system comprising a power conversion apparatus and a control apparatus as recited in claim 1.

* * * * *